US008973370B2

(12) United States Patent  
Conners

(10) Patent No.: US 8,973,370 B2
(45) Date of Patent: *Mar. 10, 2015

(54) LOW SHOCK STRENGTH PROPULSION SYSTEM

(71) Applicant: Gulfstream Aerospace Corporation, Savannah, GA (US)

(72) Inventor: Timothy R. Conners, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,524

(22) Filed: Jun. 13, 2014

(65) Prior Publication Data

US 2014/0373927 A1    Dec. 25, 2014

Related U.S. Application Data

(63) Continuation of application No. 12/605,071, filed on Oct. 23, 2009, which is a continuation-in-part of application No. 12/000,066, filed on Dec. 7, 2007, now Pat. No. 8,393,158, and a continuation-in-part of (Continued)

(51) Int. Cl.
*F02K 7/08* (2006.01)
*F02K 99/00* (2009.01)
(Continued)

(52) U.S. Cl.
CPC ............. *B64D 33/02* (2013.01); *B64D 33/06* (2013.01); *B64D 29/00* (2013.01); *F02K 3/025* (2013.01); *B64D 2033/026* (2013.01); *B64D 2033/0273* (2013.01)
USPC ............................ 60/767; 137/15.1; 244/53 B

(58) Field of Classification Search
USPC ................ 60/226.1, 767, 768, 796; 137/15.1, 137/15.2; 244/53 B
See application file for complete search history.

(56) References Cited

U.S. PATENT DOCUMENTS 2,579,049 A * 12/1951 Price ............................ 60/39.35
2,840,322 A *  6/1958 Griffith .......................... 244/15

(Continued)

FOREIGN PATENT DOCUMENTS

CA    2634012 A1   4/2008
CA    2703602 A1   4/2009
GB     879956     10/1961

OTHER PUBLICATIONS

Canadian Intellectual Property Office, Official Action for Canadian Patent Application No. 2,703,748, mailed Sep. 9, 2014.

(Continued)

*Primary Examiner* — Phutthiwat Wongwian
*Assistant Examiner* — Rene Ford
(74) *Attorney, Agent, or Firm* — Ingrassia, Fisher & Lorenz, P.C.

(57) ABSTRACT

A supersonic nacelle design employing a bypass flow path internal to the nacelle and around the engine is disclosed herein. A set of aerodynamic vanes may be used to shape a supersonic airflow within a bypass around an engine. The vanes may be capable of compressing the supersonic airflow into a subsonic airflow, direct the subsonic airflow around the engine, and then expand the subsonic airflow into a supersonic exhaust. The vanes may shape the airflow by reducing sonic boom strength, cowl drag, and airframe interference drag.

35 Claims, 27 Drawing Sheets

Related U.S. Application Data application No. 12/257,982, filed on Oct. 24, 2008, now Pat. No. 8,739,514.

(60) Provisional application No. 60/960,986, filed on Oct. 24, 2007.

(51) Int. Cl.

| | |
|---|---|
| *F02B 27/00* | (2006.01) |
| *B64D 33/02* | (2006.01) |
| *F02K 1/34* | (2006.01) |
| *B64D 29/00* | (2006.01) |
| *F02K 3/02* | (2006.01) |

(56) References Cited

U.S. PATENT DOCUMENTS

| | | | |
|---|---|---|---|
| 2,934,893 A * | 5/1960 | Streeter | 137/15.1 |
| 2,959,916 A * | 11/1960 | Carlton et al. | 138/40 |
| 2,966,028 A * | 12/1960 | Johnson et al. | 137/15.1 |
| 2,970,431 A * | 2/1961 | Harshman | 137/15.1 |
| 3,066,483 A | 12/1962 | Stratford | |
| 3,242,671 A * | 3/1966 | Moorehead | 137/15.1 |
| 3,314,437 A * | 4/1967 | Pike | 137/15.1 |
| 3,477,455 A * | 11/1969 | Campbell | 137/15.1 |
| 4,055,041 A | 10/1977 | Adamson et al. | |
| 4,483,497 A * | 11/1984 | Rethorst | 244/15 |
| 4,989,406 A | 2/1991 | Vdoviak et al. | |
| 5,311,735 A | 5/1994 | Orlando | |
| 5,971,000 A | 10/1999 | Koncsek et al. | |
| 6,487,848 B2 | 12/2002 | Zysman et al. | |
| 6,793,175 B1 * | 9/2004 | Sanders et al. | 244/53 B |
| 7,048,229 B2 | 5/2006 | Sanders et al. | |
| 7,168,236 B2 * | 1/2007 | Schmotolocha et al. | 60/204 |
| 7,322,179 B2 * | 1/2008 | Kobayashi et al. | 60/204 |
| 2006/0213179 A1 * | 9/2006 | Sanders et al. | 60/204 |

OTHER PUBLICATIONS

Canadian Intellectual Property Office, Official Action for Canadian Patent Application No. 2,703,602, mailed Aug. 12, 2014.

USPTO, Office Action for U.S. Appl. No. 13/705,211, mailed Jun. 26, 2014.

USPTO, Response to Office Action for U.S. Appl. No. 13/705,211, mailed Oct. 6, 2014.

* cited by examiner

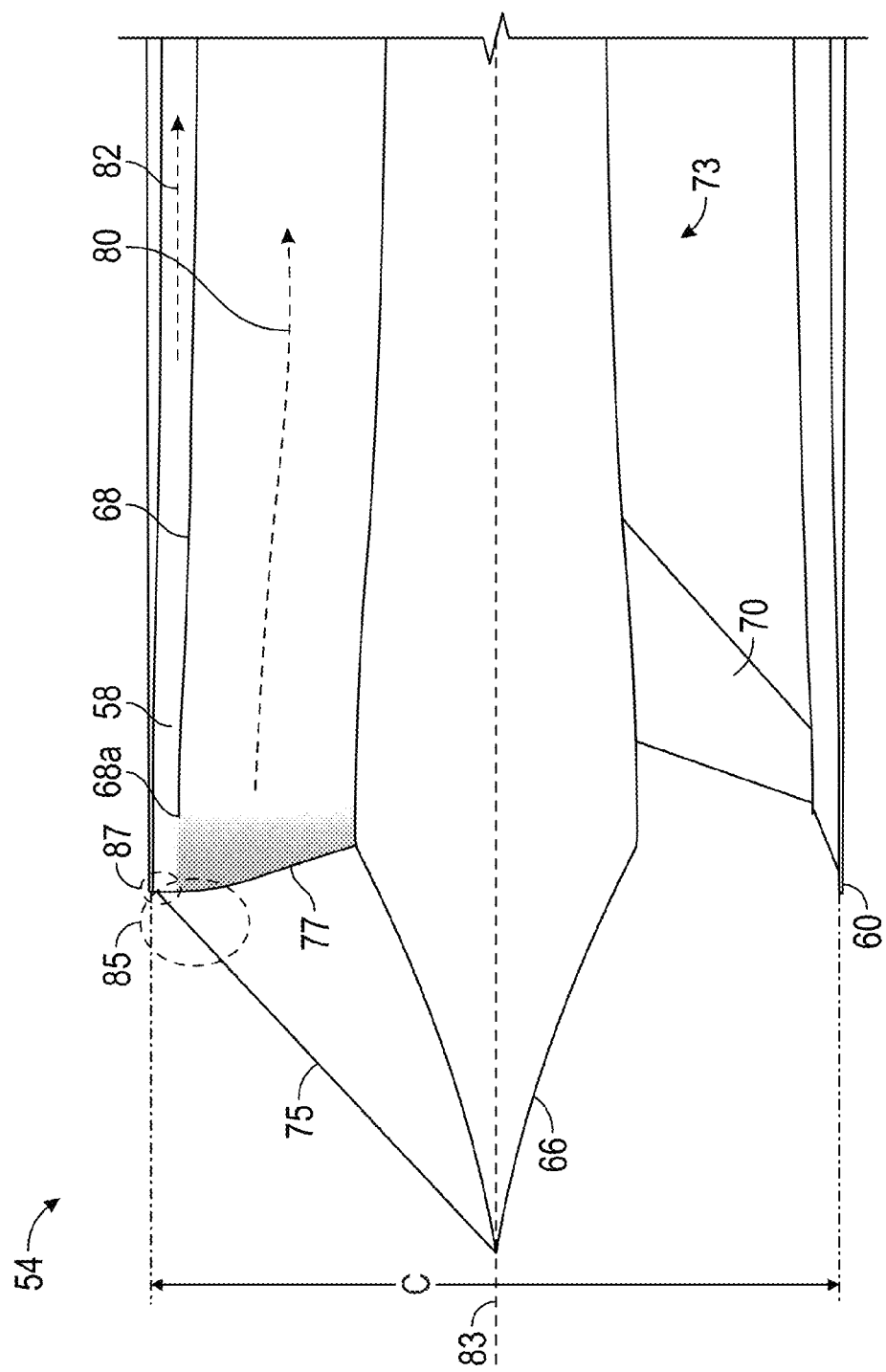

LOW SHOCK STRENGTH PROPULSION SYSTEM

This application is a Continuation of U.S. Non-Provisional patent application Ser. No. 12/605,071, filed Oct. 23, 2009, and entitled "Low Shock Strength Propulsion System" which is a Continuation-in-Part of U.S. Non-Provisional patent application Ser. No. 12/000,066, filed Dec. 7, 2007 and entitled "Low Shock Strength Inlet," and U.S. Non-Provisional patent application Ser. No. 12/257,982, filed Oct. 24, 2008 and entitled "Low Shock Strength Propulsion System," both of which claim priority to U.S. Provisional Patent Application 60/960,986, filed Oct. 24, 2007 and entitled "Supersonic Nacelle." These applications are hereby incorporated by reference in their entirety and are commonly owned by the assignee.

FIELD OF THE INVENTION

Embodiments of the invention are related to supersonic inlets and nozzles for supersonic engines and more particularly to supersonic inlets and nozzles configured with a bypass for reduced sonic boom strength.

BACKGROUND OF THE INVENTION

Many supersonic aircraft employ gas turbine engines that are capable of propelling the aircraft at supersonic speeds. These gas turbine engines, however, generally operate on subsonic flow in a range of about Mach 0.3 to 0.6 at the upstream face of the engine. In supersonic applications, a nacelle is used to encompass the engine and incorporates an inlet and a nozzle. The inlet decelerates the incoming airflow to a speed compatible with the requirements of the gas turbine engine. To accomplish this, a supersonic inlet is comprised of a compression surface and corresponding flow path, used to decelerate the supersonic flow into a strong terminal shock. Downstream of the terminal shock, subsonic flow is further decelerated using a subsonic diffuser to a speed corresponding with the in-flow requirements of the gas turbine engine. The exhaust from the engine is then accelerated again using the nozzle.

Traditional supersonic propulsion system design methods minimize the diameter and structural weight of the nacelle while maximizing gross thrust. In doing so, the amount of flow captured by the inlet is limited to only that demanded by the engine with an additional small amount for nacelle purge and cooling. A measurement of inlet operation efficiency is the total pressure lost in the air stream between the entrance side and the discharge side of the inlet. The total pressure recovery of an inlet is defined by a ratio of the total pressure at the discharge to the total pressure at the free stream. Maximizing the total pressure recovery leads to maximizing gross engine thrust, thus improving the performance of the propulsion system FIG. 1 schematically illustrates a cross-sectional view of a traditional nacelle 10, having an external compression inlet 11 and nozzle 14 surrounding an engine 16. The external compression inlet 11 compresses and decelerates the supersonic flow to the face of the engine 16. The inlet 11 includes the leading edge 12 of the compression surface and the cowl 13 forming the inlet opening of the inlet 11. The output of the engine 16 is then accelerated by the nozzle 14, creating the necessary thrust to propel the aircraft at supersonic speeds. The nacelle 10 is often designed to cover around the protruding engine parts 18, which may include engine components such as gear boxes and other components known to those of skill in the art. As shown in FIG. 1, the engine 16 may be a conventional turbofan type engine featuring approximately 15,000 lb$_f$ of maximum takeoff thrust and a moderate fan-to-compressor flow ratio of 3.

Unfortunately, the traditional nacelle design for a supersonic engine configuration often generates strong shocks off the supersonic inlet and from the body of the nacelle. A traditional approach to supersonic inlet design typically employs shock-on-lip focusing. As would be understood by those of skill in the art, shock-on-lip focusing involves designing a compression surface configuration of an external compression inlet such that the inlet-generated shocks (that occur at a supersonic design cruise speed) meet at a location immediately forward of the cowl highlight or the cowl lip.

FIG. 2 schematically illustrates the bottom half of the cross-sectional view in FIG. 1 and how shock waves and expansion regions are generated by the nacelle 10 and how the shape of the nacelle 10 may generate additional shock waves and expansion regions. As is understood by those of skill in the art, these shock waves can coalesce into a stronger shock wave as the shock waves propagate away from the aircraft during supersonic flight. These shock waves can also propagate into the aircraft surface, creating localized regions of interference drag. The shock wave 20 is generated by the leading edge 12 of the initial compression surface of the inlet 11. The wave 20 may coalesce with the shock wave 22, generated by the cowl 13, and potentially the shock waves 24 and 26. These shock waves may then coalesce with shock waves propagating from the airframe itself, eventually creating a sonic boom as heard at ground level.

The shock wave 22 is often referred to as the cowl shock, the strength of which may be directly related to the cowling angle A. In addition, any increase in cowling angle results in additional inlet frontal area, which increases inlet drag as speed increases. This adverse trend is a key reason why conventional external compression inlets lose viability at high supersonic Mach numbers. Other shock waves, such as shock wave 24, and expansion regions, identified in region 25, are often caused by changes in the shape and diameter of the nacelle 10, especially as the nacelle attempts to cover the protruding engine parts 18. The shock wave 26 is generated off the trailing edge 15 of the nozzle. As is understood by those of skill in the art, the strength of this shock wave 26 is proportional to the nozzle cowling angle B, often referred to as the nozzle boat tail angle.

Unfortunately, these shock waves combine with those from the airframe to create a louder overall sonic boom signature and more interference drag between the nacelle and the remainder of the vehicle. The stronger the shock waves, the more difficult they become to control and attenuate and the more likely they are to produce additional drag and sonic boom noise.

One way to control drag, as discussed in U.S. Pat. No. 6,793,175 to Sanders, involves configuring the inlet to minimize the shape and size of the cowl. The configuration of the inlet initially resembles a circumferential sector of an axisymmetric intake, but switches the location of compression surface to the outer radius and disposes the cowling on the inner radius in a higher performance, 3-D geometry. The fact that the cowl is located on the inner radius reduces the physical arc of the cowl. Problems with this method include the aircraft integration challenges created by the 3-D geometry, such as the fact that the cross-sectional shape may be more difficult to integrate from a packaging perspective compared to an equivalent axisymmetric design for podded propulsion systems. In addition, the complex inlet shape is likely to create complex distortion patterns that require either large scale mitigating techniques in the subsonic diffuser or the use of engines with more robust operability characteristics.

Another way to control drag by reducing the cowl lip angle is based on decreasing the flow turn angle by increasing the inlet terminal shock Mach number. The improvement in drag reduction is often negated by the reduction in pressure recovery resulting from the stronger terminal shock. In addition, increasing the terminal shock Mach number at the base of the shock also encounters significant limitations in practice due to viscous flow effects. Higher terminal shock Mach numbers at the base of the shock aggravate the shock-boundary layer interaction and reduce shock base boundary layer health. The increase in shock strength in the base region also reduces inlet buzz margin, reducing subcritical flow throttling capability. Additionally, the increase in terminal shock Mach number will most likely require complex boundary layer management or a complex inlet control system.

Inlet compression surfaces are typically grouped into two types: straight or isentropic. A straight surface has a flat ramp or conic sections that produce discrete oblique or conic shocks, while an isentropic surface has a continuously curved surface that produces a continuum of infinitesimally weak shocklets during the compression process. Theoretically, a traditional isentropic compression surface can have better pressure recovery than a straight surface designed to the same operating conditions, but real viscous effects can reduce the overall performance of the isentropic surface inlets and result in poorer boundary layer health.

FIG. 3 schematically represents a perspective view of a engine arrangement 30 representative of a high specific thrust military turbofan engine of approximately 11,000 $lb_f$ maximum takeoff thrust class (non-afterburning). The arrangement 30 may include a nacelle 32, having a traditional inlet 34 and nozzle 36. As can be seen from FIG. 3, the nacelle must be configured to encompass the protruding parts 40 of the engine 38. Moreover, the non-optimal matching between the intake area and the maximum nacelle diameter creates a large forward cowling profile that results in high drag and strong shock generation. Likewise, the non-optimal matching between exhaust area and maximum nacelle diameter causes a large nozzle boat tail angle, resulting in high drag and strong expansion and re-shock.

FIG. 4 schematically illustrates a perspective view of the engine 38 from FIG. 3 installed on the vertical stabilizer of a supersonic aircraft 42. The nacelle 32 is configured to encompass the protruding engine parts 40, creating a generally asymmetric configuration, which as discussed above may contribute to the generation of shock waves and the strength of a resulting sonic boom. While such performance may be acceptable for military aircraft or other such applications, the generation of strong sonic booms in the civil aviation arena is undesirable.

SUMMARY OF THE INVENTION

Embodiments of the invention may include a nacelle configuration that employs a bypass configured to capture, route, and exhaust the large amount of excess airflow within and through an aircraft nacelle, but external to the engine. The inclusion of a bypass stream enables nacelle shape tailoring that would otherwise not be possible for a propulsion system employing a conventional, single flow stream design. When designing a supersonic nacelle, embodiments of the invention capitalize on a broadened trade space that considers sonic boom impact, cowl drag, airframe interference drag, subsystem complexity, and structural design techniques.

In one embodiment of the invention, a supersonic nozzle for a supersonic engine comprises: an outer wall, a bypass wall disposed within the outer wall, a set of struts configured to couple the outer wall with the bypass wall. The bypass wall may be configured to separate an airflow into a primary flow portion and a bypass flow portion, such that the primary flow portion passes through the supersonic engine and the bypass flow portion passes through a bypass. The set of struts also may be configured to tailor a direction of the bypass flow portion.

In another embodiment of the invention, a low shock supersonic nacelle comprises: an engine, an outer wall, a bypass wall disposed within the outer wall, a set of struts configured to couple the outer wall with the bypass wall, an inlet defined front portions of the outer wall and the bypass wall, and a nozzle defined by rear portions of the outer wall and the bypass wall. The inlet may be configured to decelerate an incoming airflow to a speed compatible with the engine, while the nozzle may be configured to accelerate an exhaust from the engine and a bypass. The bypass wall may be configured to divide the incoming airflow into a primary flow portion directed into the engine and a bypass flow portion directed into the bypass.

In another embodiment of the invention, a method for decelerating a supersonic flow for a supersonic propulsion system comprises: cruising at a predetermined supersonic speed, receiving a supersonic flow in an inlet, splitting a subsonic flow into a primary flow portion and a bypass flow portion, diffusing the primary flow portion with a diffuser to a predetermined speed suitable for an engine, expanding the primary flow portion after the primary flow portion leaves the engine and reaches a nozzle, and directing the bypass flow portion into a substantially circumferentially uniform pattern prior to exhaust. The inlet may have a compression surface, a bypass splitter, and a cowl lip that is spatially separated from the compression surface. The bypass flow portion may receive and capture a substantial region of flow distortion created by the inlet.

In another embodiment of the invention, a nacelle for a supersonic engine comprises: an outer wall defining a closed volume, a bypass wall disposed within the volume of the outer wall, and a set of vanes configured to couple the outer wall and the bypass wall. The set of vanes defines a bypass between the outer wall and the bypass wall and is configured to compress a bypass airflow into a subsonic flow.

In another embodiment of the invention, a low shock supersonic nacelle comprises: an engine, an outer wall defining a closed volume, a bypass wall disposed within the volume of the outer wall and configured to support the engine, a set of vanes configured to couple the outer wall with the bypass wall, an inlet, and a nozzle.

In another embodiment of the invention, a method of decelerating a supersonic flow for a supersonic propulsion system comprises: cruising at a predetermined supersonic speed, splitting a supersonic inlet flow into a primary flow portion and a bypass flow portion, diffusing the primary flow portion with a diffuser to a predetermined speed suitable for an engine, compressing the bypass flow portion into a subsonic bypass flow, expanding the primary flow portion after the primary flow portion leaves the engine and reaches a nozzle, directing the subsonic bypass flow around the engine, and expanding the subsonic bypass flow to a supersonic bypass exhaust.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

It is believed that embodiments of the invention will be better understood from the following description taken in conjunction with the accompanying drawings, which illustrate, in a non-limiting fashion, the best mode presently contemplated for carrying out embodiments of the invention, and in which like reference numerals designate like parts throughout the Figures, wherein:

FIG. 7C schematically illustrates a side view of an inlet in accordance with an embodiment of the invention;

DETAILED DESCRIPTION OF THE INVENTION

The present disclosure will now be described more fully with reference to Figures in which various embodiments of the invention are shown. The subject matter of this disclosure may, however, be embodied in many different forms and should not be construed as being limited to the embodiments set forth herein.

Embodiments of the invention relates to supersonic nacelle and engine configurations that include a bypass flow around the engine. Design considerations may be used when employing a nacelle incorporating a bypass flow around the engine. For example, an expanded design space may include sonic boom impact, cowl drag, airframe interference drag, subsystem complexity, and alternative structural design techniques, all of which may be optimized against a propulsion system configuration that favors a more streamlined, albeit enlarged, nacelle shape. Growing the forward cowling diameter to better streamline the forward nacelle results in additional captured airflow that cannot be used by the engine. Without a system to efficiently dispose of this additional captured airflow, in the known prior art, the excess flow spills around the exterior of the cowl lip, creating higher drag and defeating the objective of a lower sonic boom signature. To avoid these spillage-related issues, in embodiments of the invention, the additional flow is efficiently routed internally through the nacelle and around the engine, eventually exhausting back to freestream.

Figure 1:
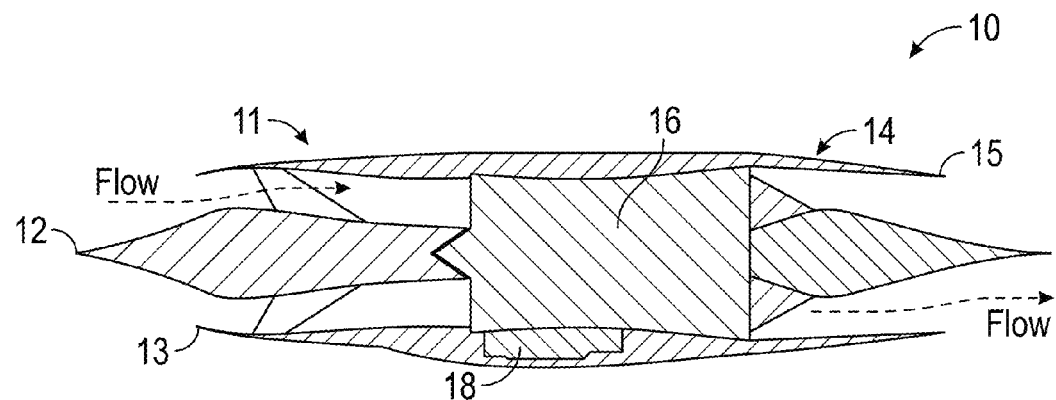
FIG. 1 schematically illustrates a cross-sectional view of a traditional nacelle.
Figure 2:
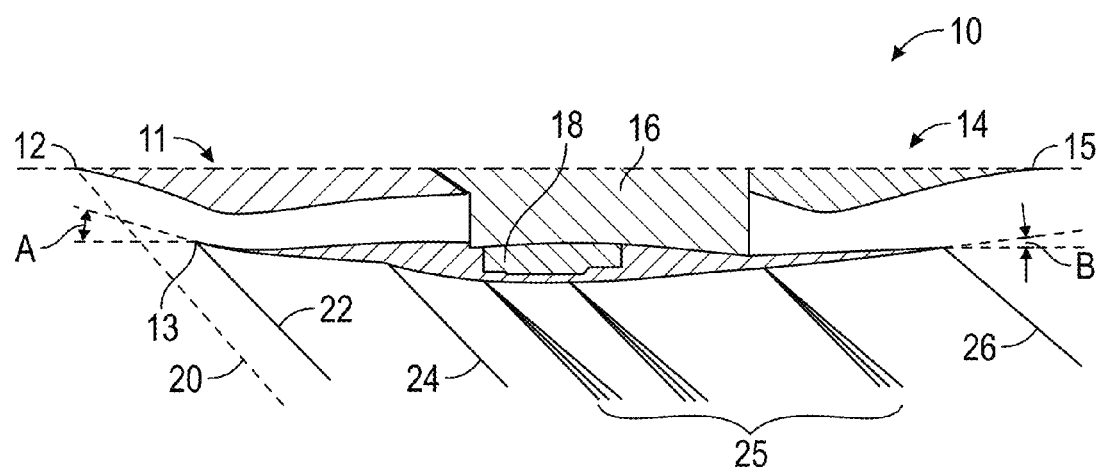
FIG. 2 schematically illustrates another cross-sectional view of a traditional nacelle with shock waves and expansion regions propagating off the nacelle.
Figure 3:
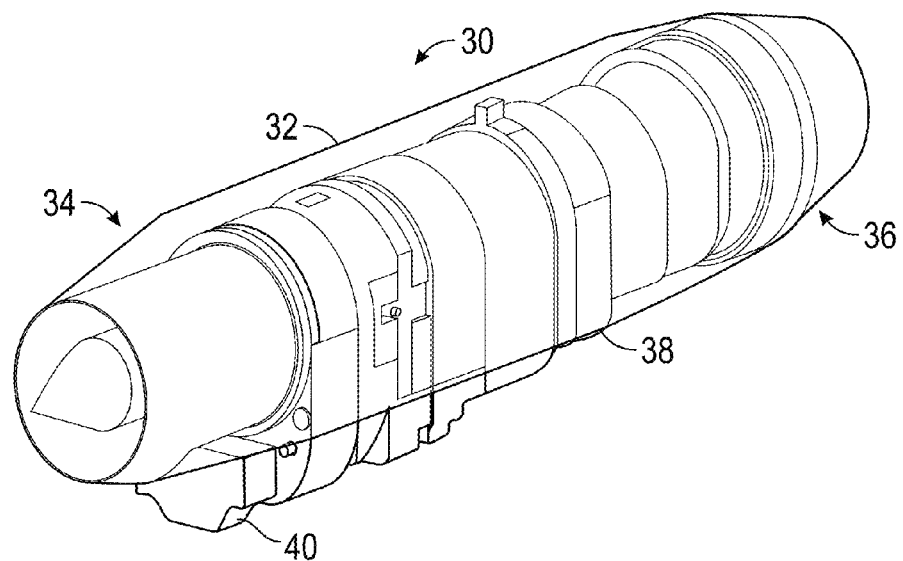
FIG. 3 schematically illustrates a perspective view of an engine arrangement and traditional nacelle design.
Figure 4:
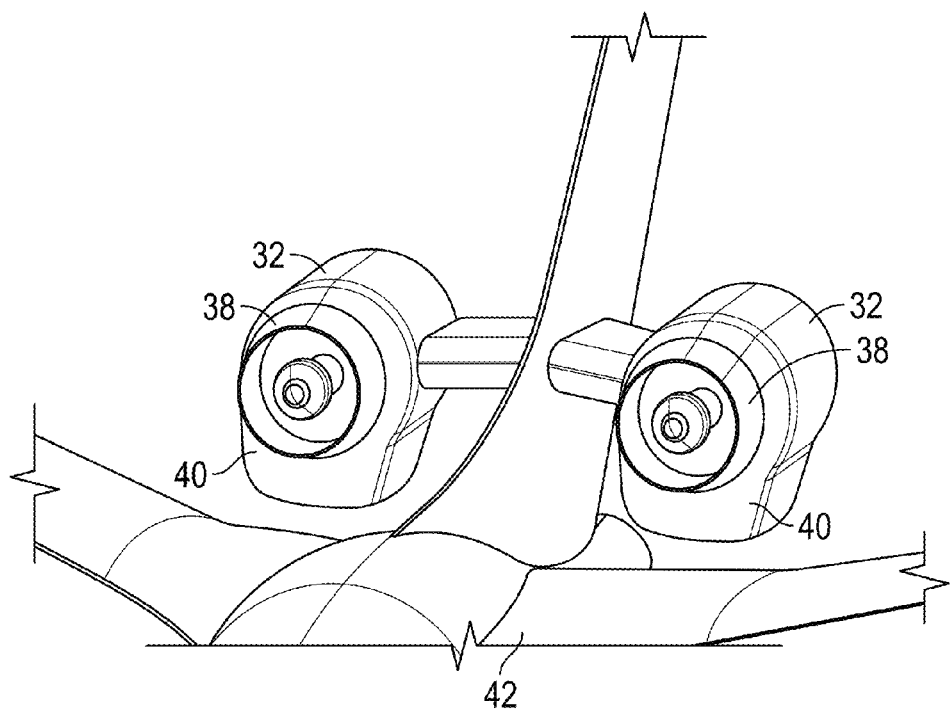
FIG. 4 schematically illustrates a perspective view of the engine and nacelle from FIG. 3 installed on a supersonic aircraft.

As would be understood by those of skill in the art, the additional air captured by the inlet does not pass through the turbomachinery and, consequently, is not energized. Losses along the internal flowpath prevent the complete re-expansion of the flow back to freestream supersonic speed upon exit from the nozzle. These losses create additional drag. However, this additional ram drag, along with the increased skin fiction that results from the larger nacelle surface area, trades against the reduction in cowl drag and airframe interference drag in addition to a potential increase in engine thrust resulting from improvement in the total pressure recovery in the primary flowpath. A properly designed bypass system may be used to minimize or eliminate any performance penalty while significantly reducing the contribution of the propulsion system to the overall In accordance with embodiments of the invention, a bypass may be configured to enhance the ability to shape or tailor the outer surface of the nacelle for improved sonic boom characteristics. As a result, embodiments of the invention may include a more streamlined ('stovepipe') nacelle profile that may provide improved matching between maximum nacelle cross-sectional area and the cross-sectional areas of engine intake and exhaust. Improved area matching reduces the local sloping of the nacelle outer surface which produces a reduction in compression (shock) and expansion region strength. Referring back to FIG. 1, the cross-sectional area of the intake defined by the cowl 13 does not match well to the maximum nacelle diameter because the cross-sectional area of the nacelle in the region of the engine must accommodate the overwhelming volume requirements of the external engine hardware, especially the gearbox. Therefore, the nacelle 10 grows dramatically in diameter around the engine 16 in order to encompass the protruding engine parts 18. The nozzle 14 is sized to pass the engine exhaust at exit velocities necessary to meet performance and sonic boom requirements: the exhaust flow is usually fully expanded at design condition to maximize thrust and to minimize the exhaust stream's disturbance of the external flow field. As shown in FIG. 1, the nozzle 14 dramatically reduces in diameter until the trailing edge 15, which defines the exit cross-sectional area of the nozzle 14.

Contrary to the traditional nacelle design shown in FIG. 1, nacelles in accordance with embodiments of the invention may be streamlined such that they produce weaker shocks and expansion zones at supersonic speeds. The nacelle design may also be configured to produce less nacelle pressure drag and airframe interference drag, when compared to a conventional nacelle that bulges outward to be form-fitted around protruding engine parts, such as the gearbox and other bulky hardware mounted to the exterior of the engine.

Figure 5:
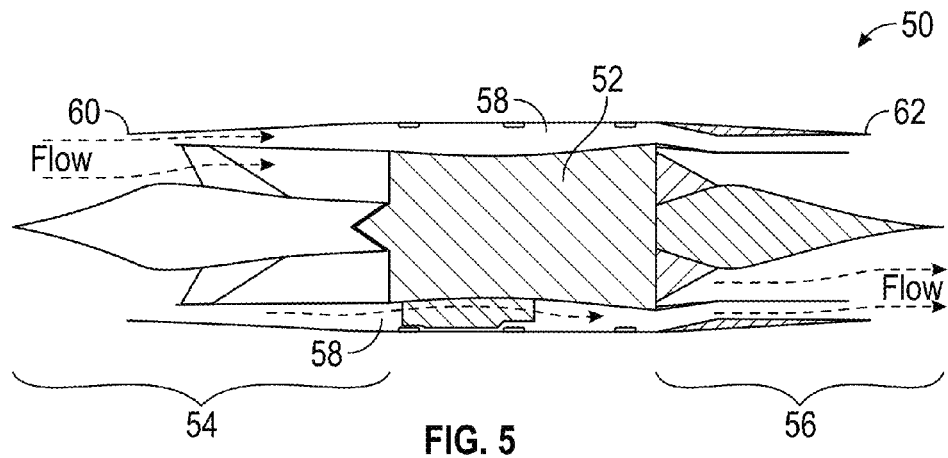
FIG. 5 schematically illustrates a cross-sectional view of a nacelle in accordance with an embodiment of the invention.

In accordance with embodiments of the invention, the outer surface of the nacelle may be configured to encompass the entire engine, including those parts that would traditionally create protrusions on the nacelle. FIG. 5 schematically illustrates a cross-sectional view of a nacelle in accordance with an embodiment of the invention which encloses an engine 52. The bypass flow fraction for the embodiment shown in FIG. 5 may be large, with about one part of flow captured by a bypass 58 for every two parts ingested by the engine, giving a bypass percentage of about 50 percent. The bypass is a portion of the flowpath internal to the nacelle that does not direct flow into, through, or out of the engine. The engine 52 shown in FIG. 5 is the same as that shown in FIG. 1. It should be understood that embodiments of the invention may be applied to any air-breathing propulsion system configured for supersonic flight. These propulsion systems could employ conventional turbojet and turbofan engines, combined cycle engines, or ramjets. Propulsion system employing variable cycle engines that use variable fan blade tip geometry may also be used.

The nacelle 50 shown in FIG. 5 also includes an inlet module 54 and a nozzle module 56. In accordance with embodiments of the invention, the bypass 58 may be configured to bypass flow around the engine 52 from the inlet 54 to the nozzle 56. The bypass 58 allows the overall design of the nacelle 50 to be more cylindrical from cowl 60 on the inlet 54 to the trailing edge 62 on the nozzle 56.

Figure 6:
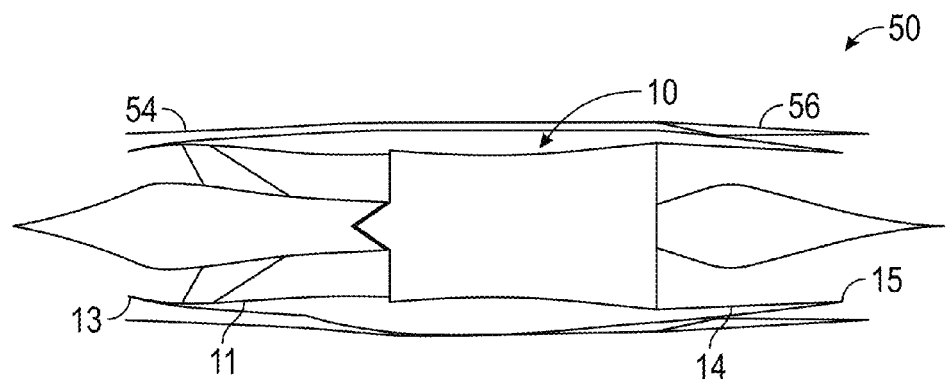
FIG. 6 shows the nacelle from FIG. 5 overlaid by the traditional nacelle from FIG. 1.

The arrangement shown in FIG. 5, which may be configured to approximate a straight pipe configuration, has dramatically less variability in the diameter of the nacelle from the intake area defined by the cowl 60 to the exhaust area defined by the nozzle trailing edge 62. FIG. 6 illustrates this difference by overlaying the traditional nacelle design 10 from FIG. 1 on top of the nacelle 50 from FIG. 5. As is clear from FIG. 6, the nacelle 50 is generally larger in diameter but is a much more streamlined design, exhibiting less change in outside circumference of the nacelle from the inlet 54 to the nozzle 56. In comparison, the inlet 11 of the nacelle 10 shows significant increase in diameter from the cowl lip 13 to the maximum diameter of the nacelle 10 surrounding the engine. Then, the diameter of the nacelle 10 reduces aftward along the nozzle 14 to the nozzle trailing edge 15. As would be understood by those of skill in the art, a more streamlined nacelle design may produce weaker shocks and less overall drag.

The larger diameter nacelle 50 results in larger intake area for the inlet 54, consequently taking more air than is necessary or than the engine can handle. As a result, the bypass 58 may be used to capture the outer radial areas of the intake flow and bypass that flow around the engine. The ability to successfully bypass this flow around the propulsion system may be enabled through the use of several additional design features that facilitate the efficient capture, routing, and exhaust of the large quantity of bypass flow.

An embodiment of the invention may include a supersonic inlet for supersonic aircraft that is configured to reduce the inlet's contribution to a supersonic aircraft's sonic boom signature. To accomplish this, embodiments of the invention may position the cowl lip of the inlet such that the inlet captures the initial conic and/or oblique shock within the intake plane, preventing the conic shock energy or discontinuity from merging with the shocks generated by the airframe during supersonic flight. It is also contemplated that the cowl angle of the nacelle may be reduced to zero or substantially zero in order to reduce the contribution of cowl shock and cowl drag on the overall signature of a supersonic aircraft.

When designing an inlet in accordance with an embodiment of the invention, a relaxed isentropic compression surface may be used. As discussed in commonly owned U.S. patent application Ser. No. 11/639,339, filed Dec. 15, 2006 (entitled "Isentropic Compression Inlet for Supersonic Aircraft"), which is hereby incorporated by reference in its entirety, a reduction in cowl angle may be achieved by designing an inlet to employ a relaxed isentropic compression surface such that the cowl angle may be reduced. A "relaxed isentropic compression" surface is an isentropic compression surface where a plurality of Mach lines do not focus on the focus point where the initial shock and the terminal shock meet. This lack of Mach line focusing may be configured to produce a total level of compression less than the level of compression generated by a conventional isentropic compression surface designed to the same criteria. The relaxed isentropic compression surface may be configured to increase terminal shock Mach number in the region of the cowl lip (creating the mechanism that reduces flow angle at the lip), but retains a reasonable terminal shock Mach number along the remainder of the shock, including the base region of the terminal shock (preserving a reasonable overall pressure recovery characteristic and good shock stability). Such an arrangement may significantly reduce the local flow angle at the cowl lip, leading to a reduction in cowling angle and a substantial improvement in performance and a reduction in shock strength.

Figure 7A:
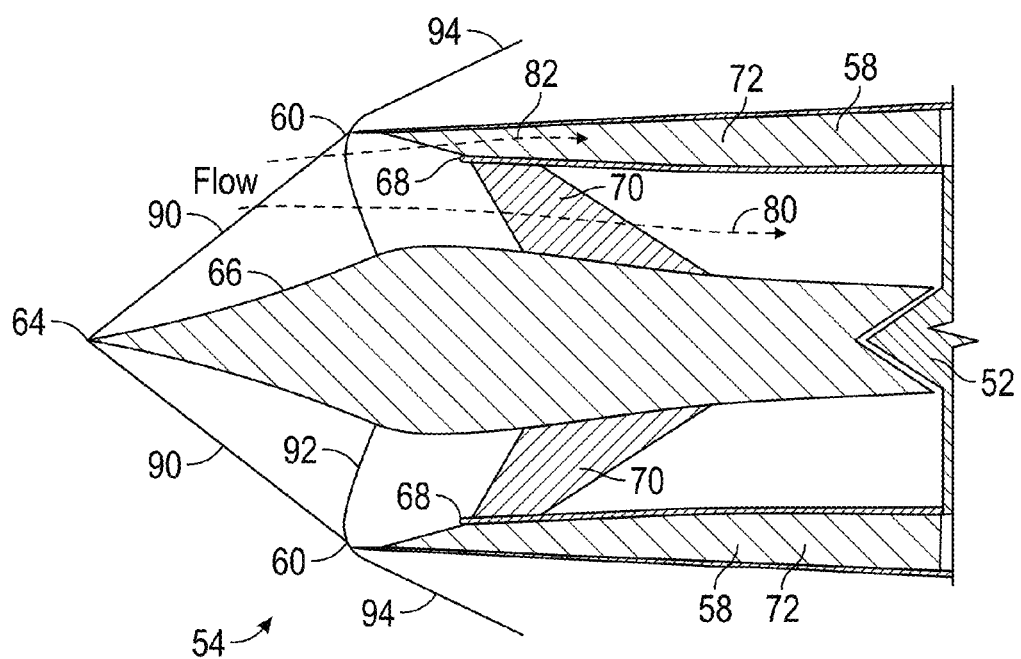
FIG. 7A schematically illustrates a cross-section of an inlet in accordance with embodiments of the invention.

FIG. 7A schematically illustrates a cross-section of the inlet 54. As shown in FIG. 7A, the inlet 54 includes a cowl lip 60 and a leading edge 64 of the external compression surface 66. The leading edge 64 generates an initial shock 90. The compression surface 66 may be configured along with the leading edge 64 and the cowl lip 60 using a relaxed compression arrangement to reduce the cowling angle of the cowl lip 60, and the strength of the cowl shock 94, effectively reducing drag on the inlet 54 as well as the inlet's contribution to the overall sonic boom signature of the vehicle.

An interior splitter 68 functions within the inlet's subsonic diffuser to bifurcate the flow into a 'primary' stream 80 that enters the engine 52 and a bypass stream 82 that circumvents the exterior of the engine through the bypass 58. As would be understood by those of skill in the art, the leading edge of the splitter 68 resides in a subsonic flow field behind the terminal shock 92, allowing the leading edge of the splitter 68 to use a blunted tip without detrimental performance impact at supersonic speeds.

Figure 7B:
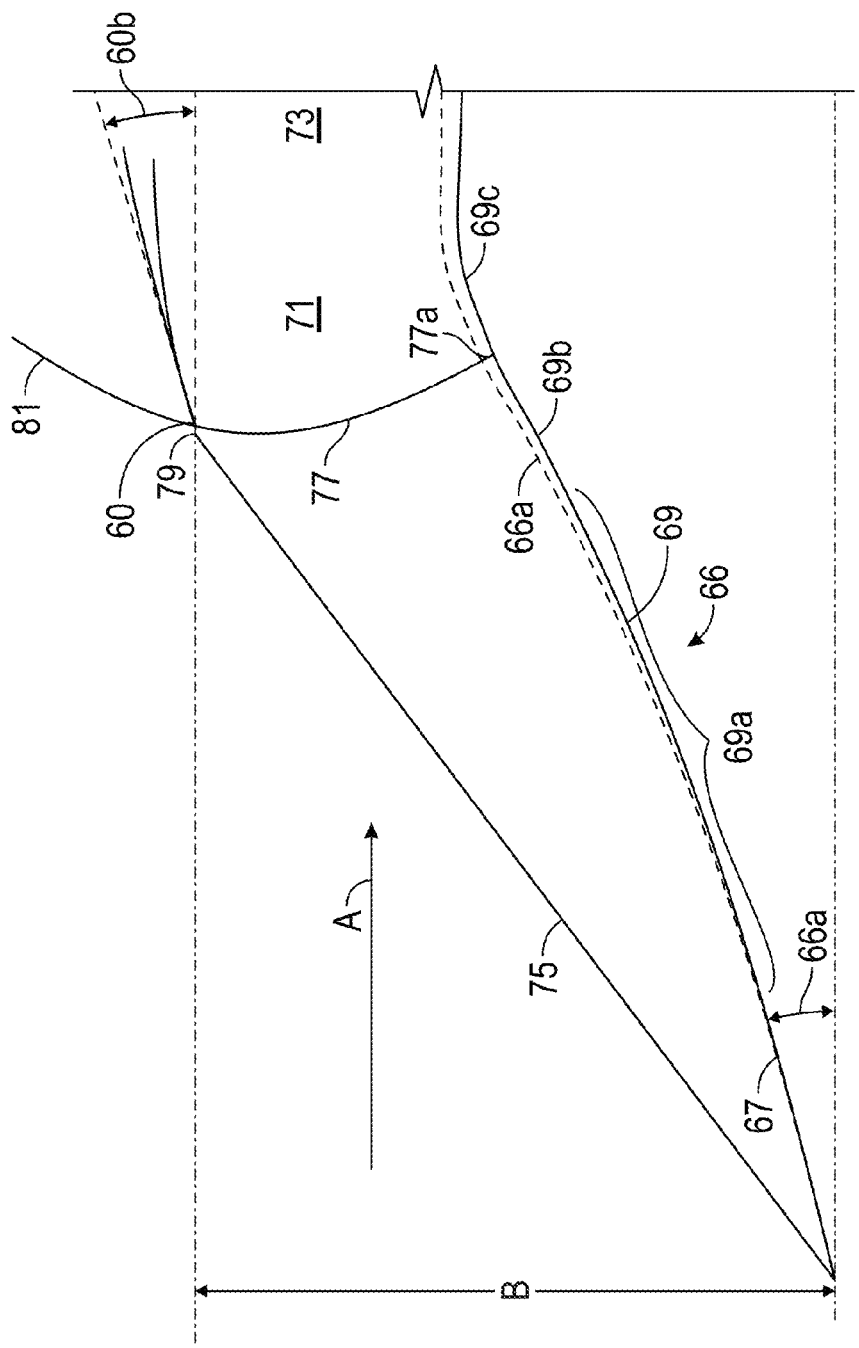
FIG. 7B schematically illustrates a side elevation view of a supersonic aircraft inlet entrance.

FIG. 7B schematically illustrates a side view cross section of a relaxed isentropic external compression inlet 54 configured using shock-on-lip focusing. The inlet 54 includes a compression surface 66 with an initial straight surface 67 at an initial turn angle 66a. The compression surface 66 includes a second compression surface 69 comprising a curved section 69a and a straight section 69b. The compression surface 66 transitions into a shoulder 69c, which defines the throat 71, the narrowest portion of the inlet 54 flow path. The inlet 54 also includes cowl lip 60 positioned at a cowl angle 60b measured off the centerline of the inlet 54. Although only the curved section 69a of the second compression surface 69 generates isentropic compression, the entire compression surface 66 is referred to herein as a relaxed isentropic compression surface. For comparison, an example of a traditional isentropic compression surface 66a is shown in a dashed line. After the flow reaches throat 71, subsonic diffuser 73 provides a divergent flow path delivering subsonic flow to the engine.

The inlet 54 first generates an initial shock 75 as the air flow in region B travels in direction A and encounters the compression surface 66 of inlet 54. The compression surface 66 may be configured to generate a terminal shock 77, having a base 77a adjacent to the compression surface 66. As shown in FIG. 7B, the initial shock 75 and the terminal shock 77 are focused at a shock focus point 79. A cowl shock 81 is shown extending upward off the cowl lip 60. The relaxed isentropic compression surface allows for significant tailoring of the terminal shock 77 such that the outer radial region of the shock is nearly orthogonal to the inlet centerline. By shaping the terminal shock using relaxed compression, the cowl lip 60 may be aligned with the local flow angle in this outer radial region of the shock, greatly reducing the cowl lip angle. In addition, discrete adverse flow features, such as secondary shock formation or flow separation, may be reduced at the cowl lip region.

Although the cowl angle may be greatly reduced when using a relaxed isentropic compression inlet in accordance with FIG. 7B, the cowl lip is still aligned with the local flow angle in the outer radial region of the terminal shock directly in: front of the cowl lip. As would be understood by those of skill in the art, reducing the cowl angle 60b, from the angle shown in FIG. 7B to zero or substantially zero may result in flow distortion in the diffuser which may increase when the cowling angle no longer aligns with the local flow in the vicinity of the terminal shock. This condition may generate secondary shocks and adverse pressure fields in the vicinity of the cowl lip, which can introduce strong tip radial blockage defects in the flow seen by the engine at the fan face. Further, simply reducing the cowl angle 60b to zero or substantially zero may also create temporal flow instability within the diffuser, potentially resulting from the flow disturbances created in the outer radial region which may initiate and sustain diffuser flow resonance. Such resonance may adversely affect performance and potentially damage the inlet and the engine.

Additionally, a simple reduction in cowl angle may be ineffective in controlling aft cowling drag, or drag on the nacelle aft of the cowl lip resulting from any increase in nacelle diameter as the nacelle profile encompasses the engine. This increase in nacelle diameter may cause a sharper gradient in the surface angle of the cowling as the maximum nacelle diameter is approached.

Furthermore, when the cowl lip is positioned to capture the initial or conic shock and the terminal shock in accordance with embodiments of the invention, flow instabilities internal to the inlet may be introduced. As would be understood by those of skill in the art, the capture of the conic and terminal shocks may decrease the predictability of the post terminal shock flow environment and introduce flow separation on the inside cowl surface and produce unwanted flow dynamics.

As shown in FIG. 7C, the inlet structure and arrangement may be configured such that the cowl lip angle is extremely small or even reduced to zero. As would be understood by those of skill in the art, a zero or substantially zero cowl lip angle reduces the strength of the cowl shock due to reductions in the projected surface area exposed to the freestream flow. Although the thickness of the cowl lip may include some finite amount of material required to build the cowl lip, the cowl lip structure may be extremely thin, depending on materials and application. It is contemplated that the nacelle wall thickness may grow inward moving aft along the internal flowpath, providing the volume necessary to incorporate structure while maintaining the uniform external diameter surface shape.

By employing a zero or substantially zero cowl lip angle, with reference to a inlet axis 83, the region C may grow, especially if the nacelle is configured to fully encompass the engine without significant growth or contraction in the outer diameter of the nacelle. Such a configuration may reduce or eliminate the typical sharp growth of the outer diameter of the nacelle aft of the cowl lip as the nacelle encompasses the engine. As would be understood by those of skill in the art, a more cylindrical shape of uniform outer diameter may significantly reduce cowling drag and cowl shock strength.

In accordance with embodiments of the invention, the nacelle bypass 58 may be configured to handle the additional airflow that may enter the inlet due to the larger region C. By employing the bypass 58, the inlet 54 may be configured to dispose of the excess flow, which would alternatively spill around the exterior of the cowl lip, creating higher drag and defeating the objective of a lower sonic boom signature. The nacelle bypass 58 avoids these spillage-related issues by routing the additional flow through the nacelle and around the engine, eventually exhausting back to the free stream.

The nacelle bypass 58 may also serve to separate the flow distortion captured by the inlet 54. As discussed in U.S. patent application Ser. No. 11/639,339, the use of a relaxed isentropic compression surface 66 may generate an initial shock 75 and a terminal shock 77, which may be focused at a point. The relaxed isentropic compression surface may also be configured to tailor the terminal shock 77 such that a region 85 of relaxed compression is produced. As a result, the strong velocity gradient in the outer radial region may generate the region 85 of flow distortion. In accordance with embodiments of the invention, the bypass 58 may be structured and arranged to separate the worst of the flow distortion internal to the inlet 54 as shown as region 87. This region 87 may include flow distortions introduced by the intersection of the initial shock 75 and the terminal shock 77. In addition, the region 87 may include flow distortion created by the sharp cowl lip 60, which may produce unfavorable flow distortion in the presence of cross-flow; for example, when the vehicle experiences significant sideslip or angle-of-attack, or when the vehicle is subjected to high crosswinds while operating on the ground.

More specifically, the bypass 58 operates to split the distorted flow in the region 87 into the bypass 58, forming a bypass flow 82, which is separated from the primary flow 80 by the splitter 68. The splitter 68 prevents the bypass flow 82 and its inherent flow distortions from reaching the sensitive turbomachinery. The resulting primary flow 80 may then exhibit more uniform flow that may provide significant benefits to engine life and engine maintenance factors and improved fan and compressor stability margins. The primary flow 80 profile may also benefit the engine performance by providing an increase in pressure recovery that results from the removal of the more distorted, lower pressure flow found in the region 87. The subsonic diffuser 73 may be configured to further slow the primary flow 80 into a subsonic flow suitable for use by the engine. Also, the blunt leading edge 68a of bypass splitter 68 may be configured to couple favorably with cowl lip 60 to produce a reduced flow distortion profile for the engine, similar to a traditional subsonic inlet.

The nacelle bypass 58 may also provide for the disposition of residual discrete flow defects or temporal flow instabilities, such as blockage profiles resulting from flow separation or secondary shocks within the cowl lip area. The bypass 58 may work to eliminate resonance coupling between tip radial and centerbody boundary layer-related flow features that can otherwise create adverse and strong instabilities, such as inlet buzz and other resonance types.

In accordance with embodiments of the invention, the inlet 54 may capture the initial conic or oblique shock 75 within the intake plane of inlet 54. Capturing the conic shock 75 may be accomplished by either a forward extension or movement of the cowling or by sizing the inlet to a Mach number slightly lower than the design point. Although capturing the conic shock 75 would typically introduce large-scale flow instabilities from the interaction between the conic shock and the boundary layer immediately aft of the cowl lip, the bypass 58 may be configured such that the conic shock 75 may be captured without significant impact on the primary flow 80. As a result, the nacelle bypass 58 provides for a separation, isolation, and disposal mechanism for the resulting spatial and temporal flow defects produced by conic shock capture, leaving the primary flow path 80 significantly unaffected.

Figure 8:
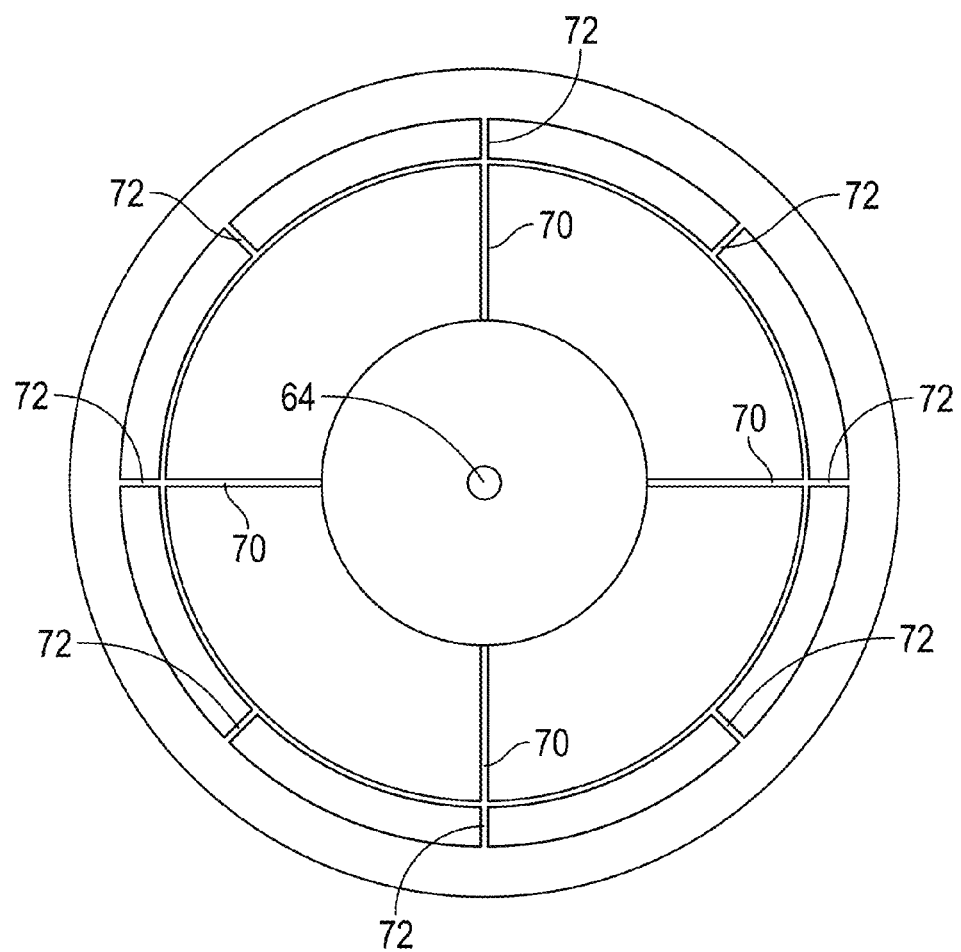
FIG. 8 illustrates a plane view of the inlet in FIG. 7A from the front of the inlet looking in the aft direction.

Referring back to FIG. 7A, the inlet 54 includes struts 70 and struts 72 configured to stabilize the entire structure of the inlet 54. FIG. 8 illustrates a plane view of the inlet 54 in FIG. 7A looking in the direction of air flow at the face of the inlet 54.

As would be understood by those of skill in the art, the sharp leading edge of the cowl lip 60 provides lower shock strength and drag characteristics at supersonic speeds compared to a configuration using a more blunt lip. However, sharp cowl lip inlet designs often produce unfavorable flow distortion in the presence of cross-flow, as when the vehicle is flying at significant sideslip or angle-of-attack or when subjected to high cross-winds while operating on the ground. High flow distortion within the diffuser subsequently enters the engine, reducing performance and consuming engine operating stability margins. By including the internal splitter and the bypass 58, the detrimental effects during low speed operation may be mitigated. As discussed in more detail below, the blunt internal splitter leading edge 68 couples favorably with the sharp cowl lip 60 to produce a reduced flow distortion profile for the engine face even at low speed or static conditions. In effect, the sharp cowl lip 60 and the blunt leading edge 68 function together to create a virtual inlet low speed inlet producing a low speed distortion flow, similar to a traditional subsonic inlet.

Figure 9A:
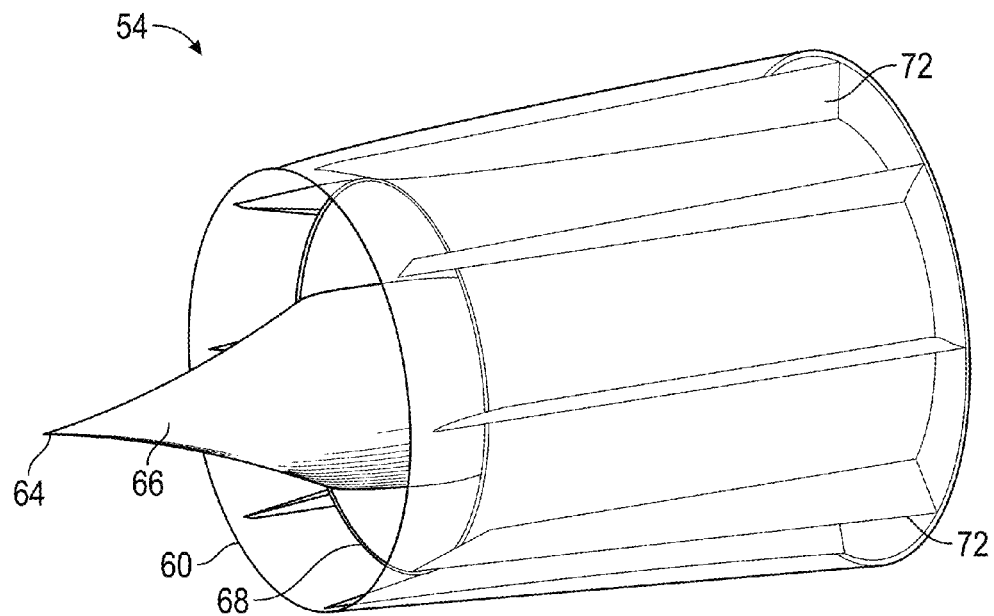
FIGS. 9A and 9B show perspective views of the inlet of FIG. 7A with the out wall of the nacelle drawn transparent.
Figure 9B:
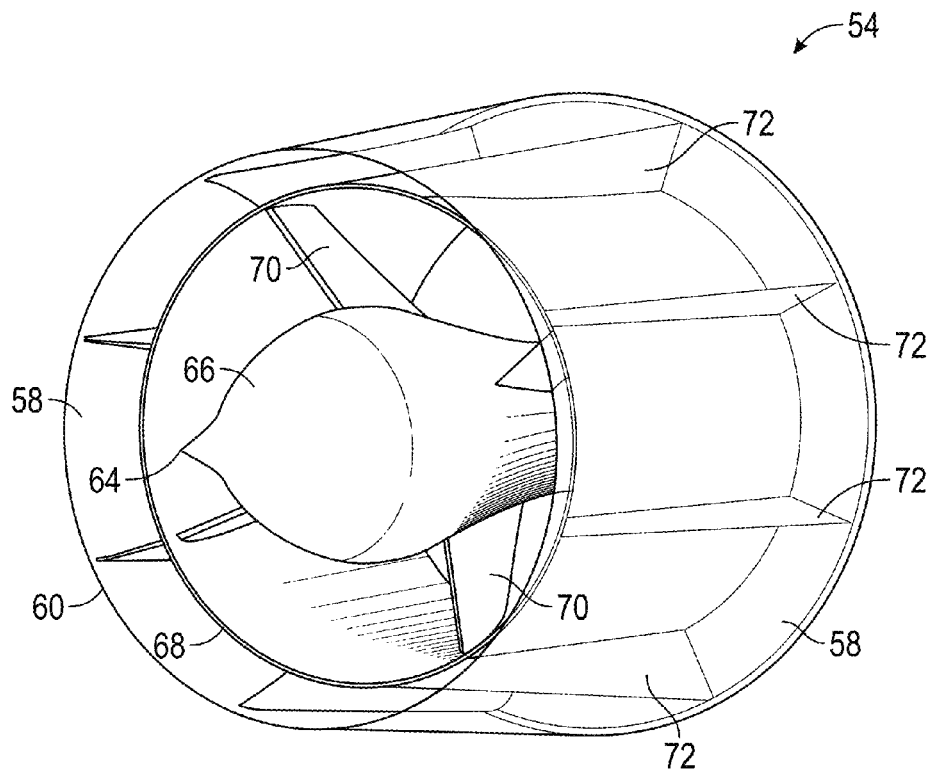
Figure 9C:
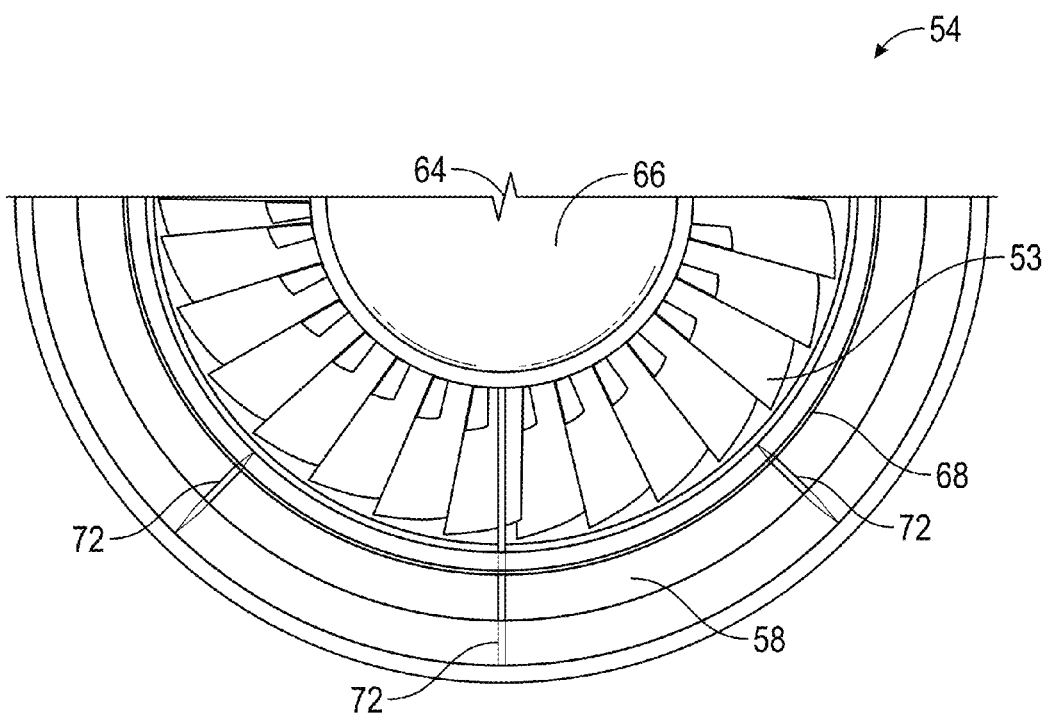
FIG. 9C illustrates another plane view of the inlet in FIGS. 7A, 8, and 9A-B with the engine face shown at the back of the inlet.

FIGS. 9A and 9B show perspective views of the inlet 54 with the outer surface of the inlet 54 drawn as transparent such that the internal struts 72 of the bypass 58 may be clearly seen. FIG. 9C illustrates another plane view of the inlet 54 in FIGS. 7A, 8, and 9A-B with the engine face shown at the back of the inlet 54. As shown in FIG. 9C, the engine fan 53 of engine 52 can be seen internal to the splitter leading edge 68. The bypass 58 is shown external to the fan 53 of the engine 52 such that the bypass flow 82 may flow around the engine 52.

Figure 10A:
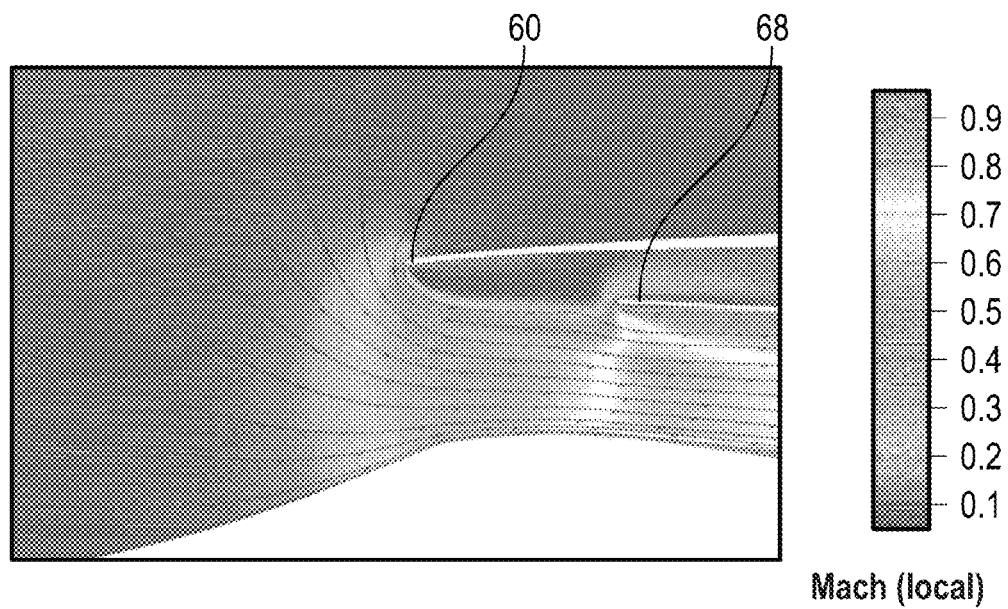
FIG. 10A illustrates a Computational Fluid Dynamics (CFD) solution for the inlet in FIG. 7A at a static or low speed condition.

Referring back to the blunt internal splitter leading edge 68, typical low flight speeds or static operating conditions produce unfavorable flow characteristics for sharp cowl lips such as cowl lip 60. However, the blunt splitter leading edge 68 couples favorably with the sharp cowl lip 60 to produce a reduced flow distortion profile for the engine face even at low speed or static conditions. FIG. 10A illustrates a computational fluid dynamic (CFD) solution for a static or low speed condition. As shown in FIG. 10A, the flow at low speed or static conditions produces a large recirculating flow region directly under the cowl lip 60. As would be understood by those of skill in the art, such a recirculating flow condition would produce unfavorable engine performance if the distortion aggravating effects of the recirculating flow region reached the engine face. The blunt leading edge 68 produces a smoother flow tight against the inside surface of the internal splitter. As shown in FIG. 10A, the smooth flow comes off the cowl lip 60 and rides over the separated flow region before it encounters the splitter leading edge 68. The leading edge 68 then traps the separated flow between the two leading edges 60 and 68, allowing the flow to the engine face to exhibit a low distortion profile.

Figure 10B:
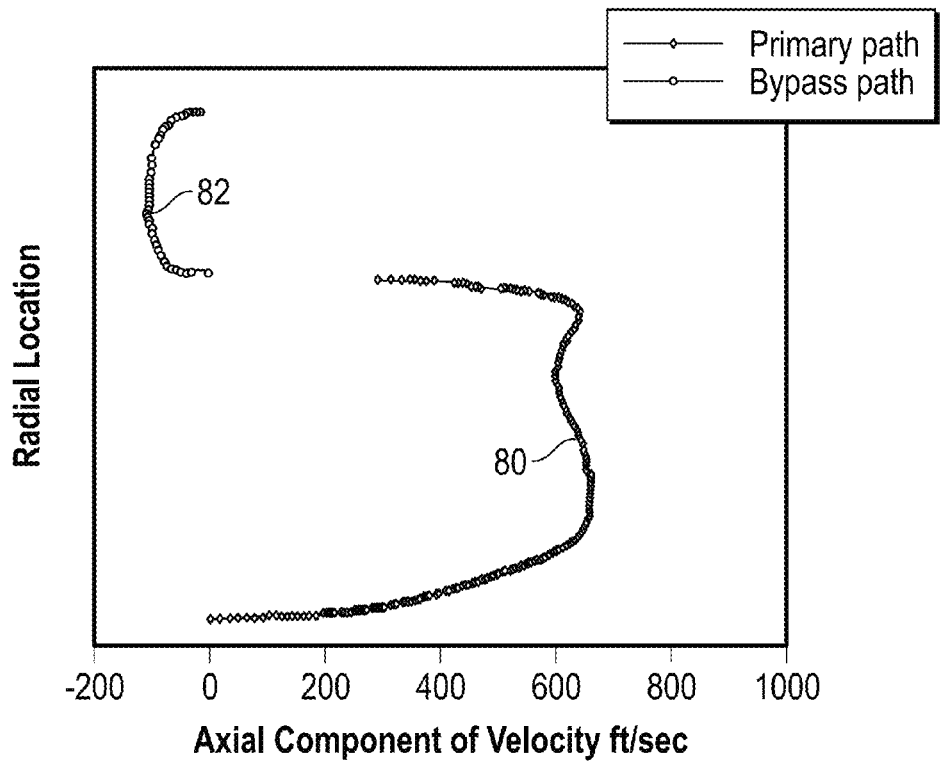
FIG. 10B shows a graph plotting the axial component of the velocity of the flow within the diffuser shown in FIG. 10A against the radial distance from the center of the nacelle.

FIG. 10B illustrates this low distortion profile by plotting the axial component of the velocity of the flow against the radial distance from the center of the nacelle at a location just forward of the engine entrance plane. The flow 80 in the primary path presents a generally low distortion profile as seen by the engine at low speed. As would be understood by those of skill in the art, without the internal splitter to separate the flow, the sharp edge of the cowl lip 60 would introduce significant distortion to the engine face. The flow 82 in the bypass path is represented with a negative velocity as air is pulled forward through the bypass 58 from behind the engine. Again, as would be understood by those of skill in the art, engine stability margins and performance increase correspondingly with reductions in distortion. Furthermore, the lower flow distortion may be used to eliminate the typical requirement for low-speed distortion-attenuating auxiliary intakes, reducing the complexity of the supersonic inlet 54.

Figure 11A:
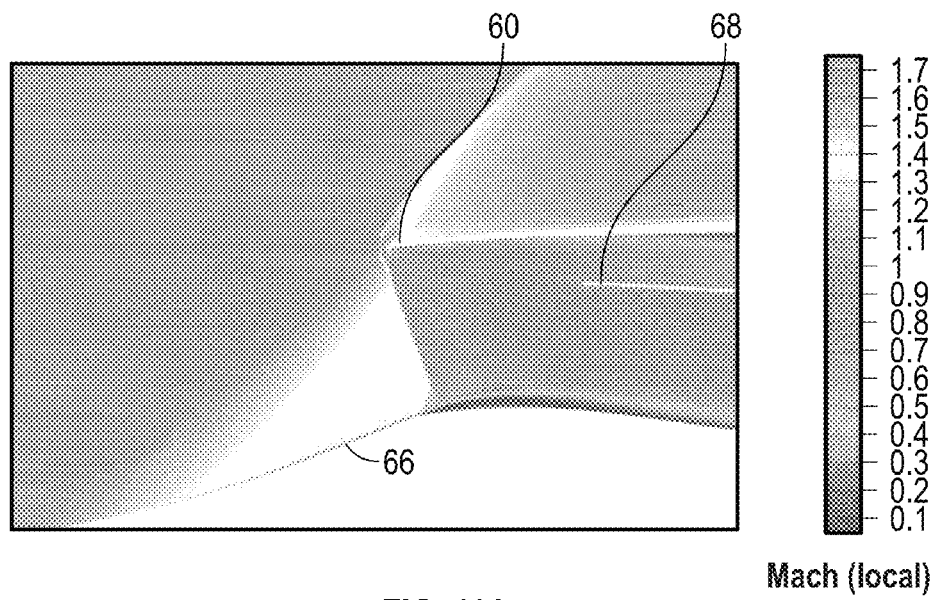
FIG. 11A illustrates a CFD solution for the inlet in FIG. 7A at a supersonic design speed of Mach 1.7.

FIG. 11A illustrates a CFD solution for an inlet in accordance with embodiments of the invention at a design speed of Mach 1.7. At high flight speed, the internal splitter may be configured to enhance the performance benefit of isentropic relaxed compression inlet technology. The isentropic relaxed inlet compression permits a significant reduction in cowling angle, and associated drag and shock strength. But this benefit trades against a reduction in total pressure created by an unfavorable velocity gradient, generated by the compression surface 66, at the outer radial edges of the entrained flow. This velocity gradient produces a strong flow distortion profile within the diffuser that adversely impacts engine performance and stability margins as the distorted flow is ingested by the engine. Although some engines may be configured to handle these radial velocity gradients, the positioning of the bypass splitter 68 may be configured to separate the outer radial flow, which contains the dramatic velocity gradient, from the primary flow stream at high flight speed or supersonic speeds, preventing the distorted flow from reaching and affecting the engine.

Figure 11B:
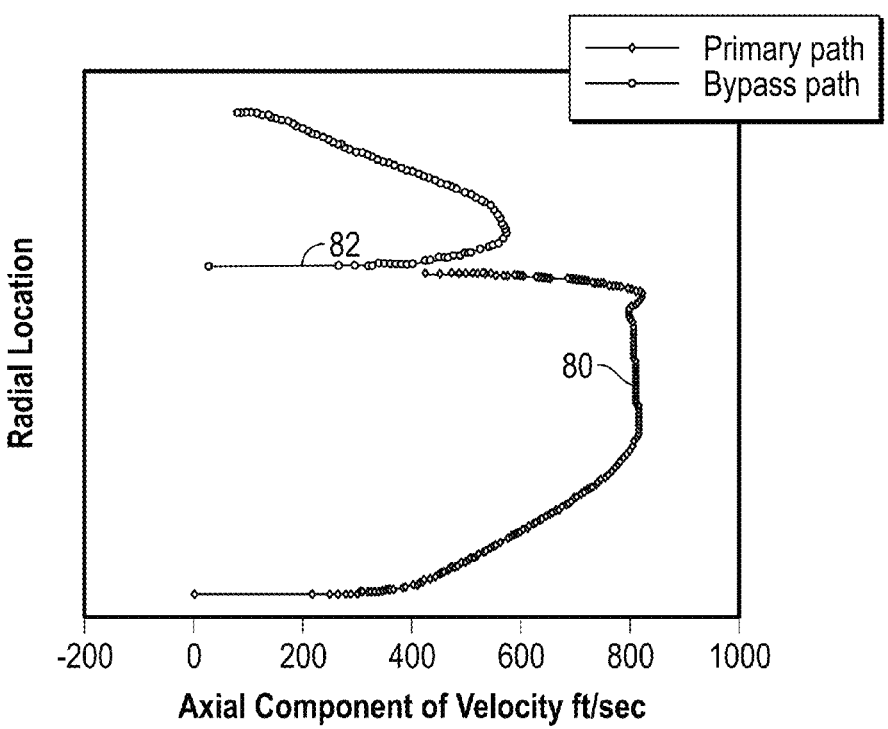
FIG. 11B shows a graph plotting the axial component of the velocity of the flow within the diffuser shown in FIG. 11A against the radial distance from the center of the nacelle.

FIG. 11B illustrates the flow profile at Mach 1.7 design speed by plotting the axial component of the velocity of the flow against the radial distance from the center of the nacelle at a location just forward of the engine entrance plane. During supersonic flight, the severe outer radial distortion pattern 82 produced by the compression surface may be confined primarily to the bypass path around the engine. The flow 80 follows the primary path to the engine face, illustrating a generally smooth flow profile within the flow stream 80 entering the turbomachinery. As would be understood by those of skill in the art, the result is an improvement in total pressure recovery at the engine face and an increase in engine performance and stability margins.

Figure 11C:
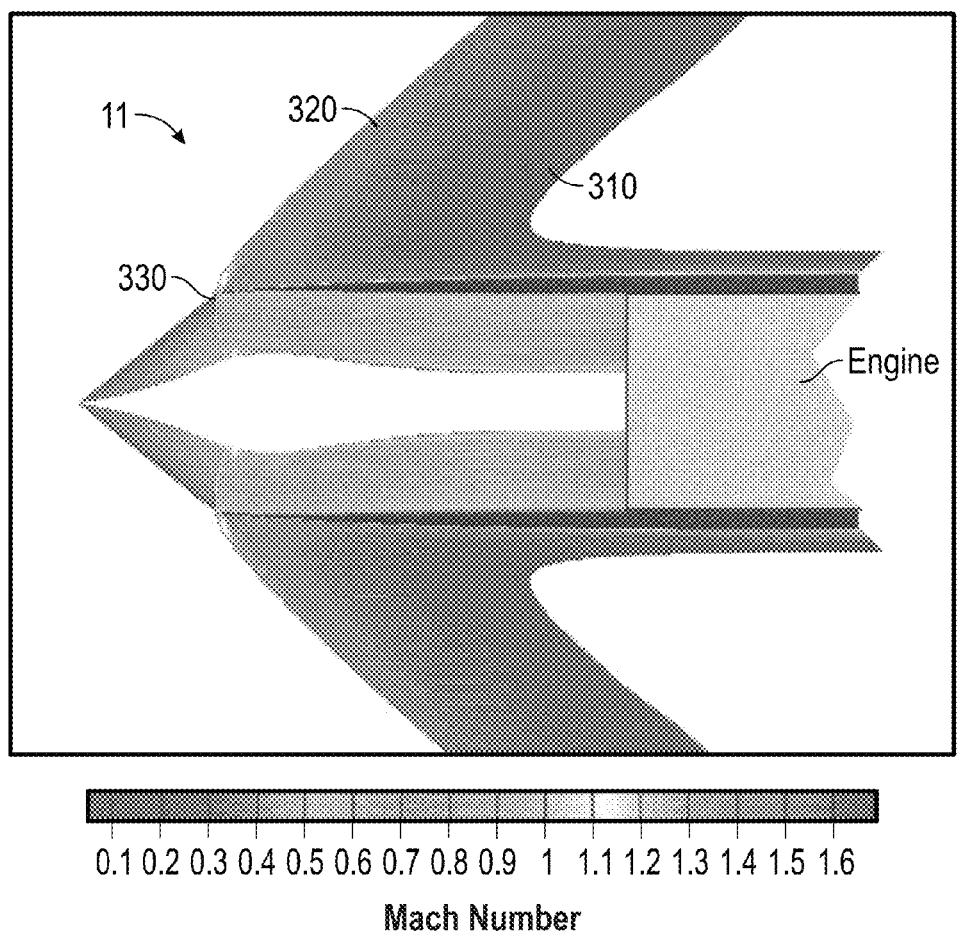
FIG. 11C illustrates a Mach color CFD solution of an inlet with a conventional cowl.

FIG. 11C illustrates a Mach color computational fluid dynamics (CFD) solution for an inlet 11 in FIG. 1 employing a relaxed isentropic compression design and shock-on-lip focusing with a cowl lip placed such that the conic shock is not captured by the inlet. FIG. 11 D illustrates a Mach color computational fluid dynamics (CFD) solution for an inlet 54 in FIG. 5 in accordance with an embodiment of the invention. As with inlet 11, the inlet 54 employs a relaxed isentropic compression design. However, inlet 54 includes a near-zero cowl angle and is configured to capture the conic shock internal to the inlet. FIGS. 11 C and 11 D represent inlets sized for a turbofan-type engine featuring approximately 15,000 lb$_f$ of maximum takeoff thrust and a moderate fan-to-compressor flow ratio of 3. Those areas of the flow field disturbed by less than 0.01 Mach number unit from the freestream Mach number value are rendered white in both FIGS. 11C and 11D.

Figure 11D:
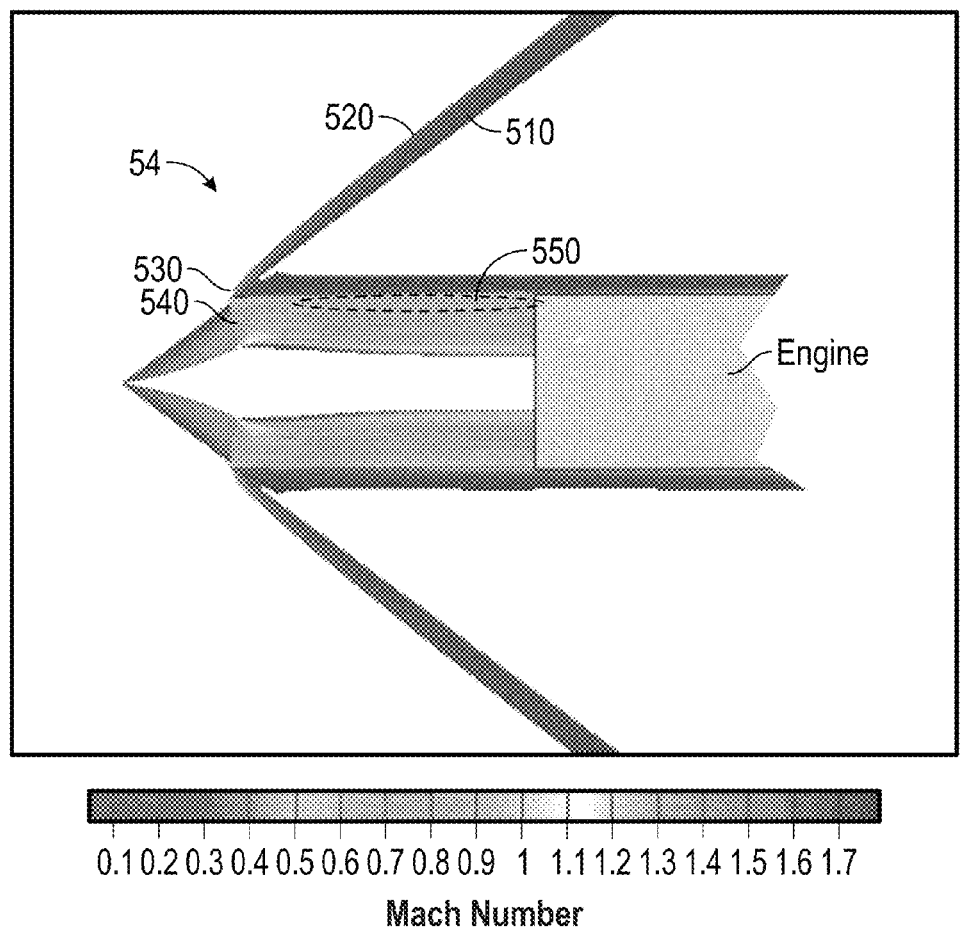
FIG. 11D illustrates a Mach color CFD solution of an external compression inlet with a zero-angle cowl in accordance with an embodiment of the invention.

In comparison, the inlet 54 in FIG. 11D exhibits a greatly reduced shock disturbance region 510 due to the zero-angle cowl and conic shock capture. This may be easily seen by comparing the shock disturbance region 310 in FIG. 11C and the shock disturbance region 510 in FIG. 11D. In FIG. 11C, a large region 310 of disturbance is shown extending out and away from much of the forward nacelle surface. This indicates that the cowl shock 320, in FIG. 11C, is much stronger that the cowl shock 520, in FIG. 11D. The strong cowl shock 320 will propagate away from the nacelle and eventually merge with shocks generated by aircraft airframe. In FIG. 11D, however, a relatively thin cowl shock disturbance 510 extends out and away from only the very tip of the nacelle adjacent to the zero-angle cowl lip. This is indicative of a much weaker cowl shock 520 that will contribute less to the overall sonic boom signature.

Also illustrated in FIGS. 11C and 11D, the reduction in spillage may be seen for inlet 54 over inlet 11. As would be appreciated by one of skill in the art, the flow spillage 530 shown in FIG. 11D for the inlet 54 is significantly less that the small amount of flow spillage 330 shown in FIG. 11C for the inlet 11. Specifically, FIG. 11D shows minimal spillage close to the cowl lip, indicated by a significantly reduced cowl shock strength. For inlet 54, these reductions in shock strength directly reduce the inlet's contribution to a sonic boom signature for a supersonic aircraft employing inlet 54. As one of ordinary skill in the art will appreciate, the capture of the conic shock and the terminal shock 540 functions to virtually eliminate the flow spillage 530 and its related contribution to shock strength. Moreover, the lack of any significant cowling profile (due to zero cowl angle) virtually eliminates cowl shock and cowl drag. The reduction in flow spillage 530 also reduces drag.

FIG. 11D also illustrates a flow distortion 550 that is separated and isolated from the engine face. As discussed above, the zero or substantially zero cowl angle and the capture of the conic shock and terminal shock 540 may introduce flow distortions located in the outer radial region of the inlet. Although the bypass splitter is not shown in FIG. 11D, the flow distortion 550 adjacent to the cowl lip and the outer surface of the diffuser walls illustrates adverse flow characteristics that could be detrimental to the operability, performance, and life of the fan blades at an engine face. As discussed above, these adverse flow characteristics may be separated and isolated by the bypass 58.

The bypass may also provide significant attenuation of dynamic flow properties produced by inlet design and operating characteristics traditionally viewed as undesirable. For instance, the supersonic inlet is typically constructed to position the initial conic or oblique inlet shock outside of the cowl lip at the supersonic design point. This design technique results in increased flow spillage and drag, but is generally viewed as necessary to avoid unacceptable flow dynamics due to ingestion of the initial shock. Such ingestion can produce a separated flow region on the inside surface of the cowling that initiates high-amplitude flow oscillations detrimental to safe engine operation and potentially damaging to the structure of the inlet. By segregating the outer radial flow (that flow affected by directing the initial conic shock inside the cowl lip), the splitter 68 in FIG. 7A protects the primary flow path to the engine face. As a consequence, the high-volume bypass stream may provide an independent zone, separated from the primary flow path, that can serve to decouple and buffer the flow communication mechanics that otherwise drive ingested shock oscillation.

Referring back to FIGS. 7A, 8, and 9A-C, the bypass 58 itself can be employed to handle structural load bearing duties typically assigned to an outer nacelle wall. In particular, support struts 72 in the bypass 58 of the inlet 54 may be configured to couple the splitter 68 to the outer wall of the nacelle using a thin-wall composite structure, as an example. Such an arrangement may be used to produce a stiff, strong, and lightweight nacelle structure, while maximizing the internal nacelle volume, which may then be used for bypass flow management. The struts in the bypass stream can also be used to tailor the direction and amount of airflow depending on local blockage characteristics within the bypass region. For instance, the gearbox might completely block a significant circumferential and radial portion of the bottom region of the bypass stream. The bypass struts in the inlet module can be used to bifurcate the entrained bypass flow around the gearbox blockage. Another set of struts in the rear nacelle could be used to redirect the flow back into a more circumferentially uniform pattern once aft of the gearbox.

Figure 12:
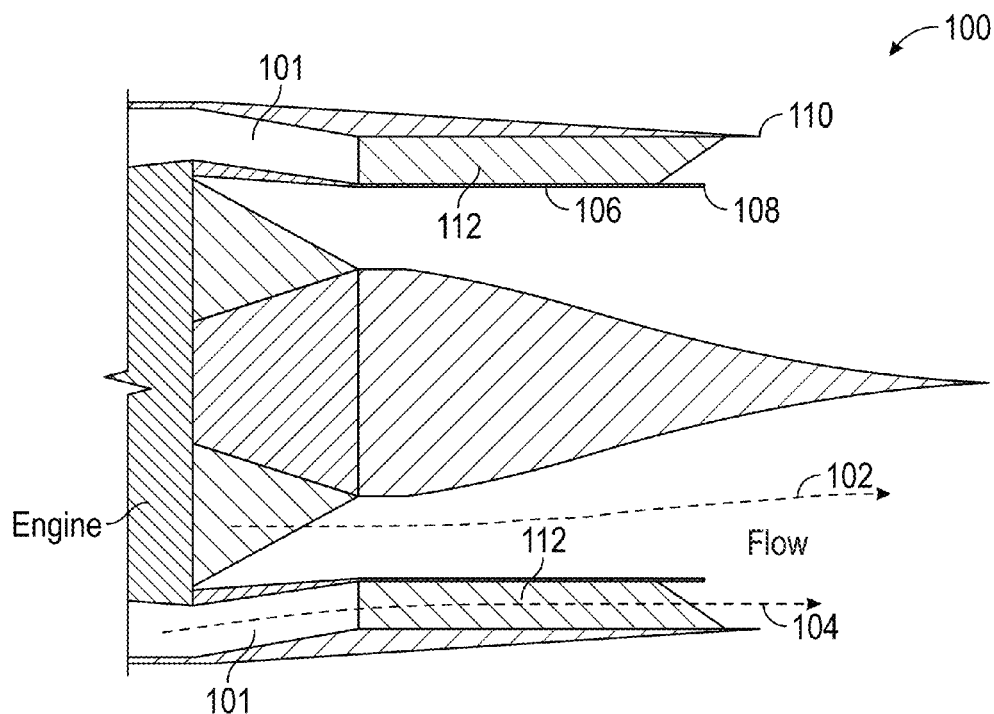
FIG. 12 schematically illustrates a cross-sectional view of a nozzle 100 with a bypass path in accordance with an embodiment of the invention.
Figure 13:
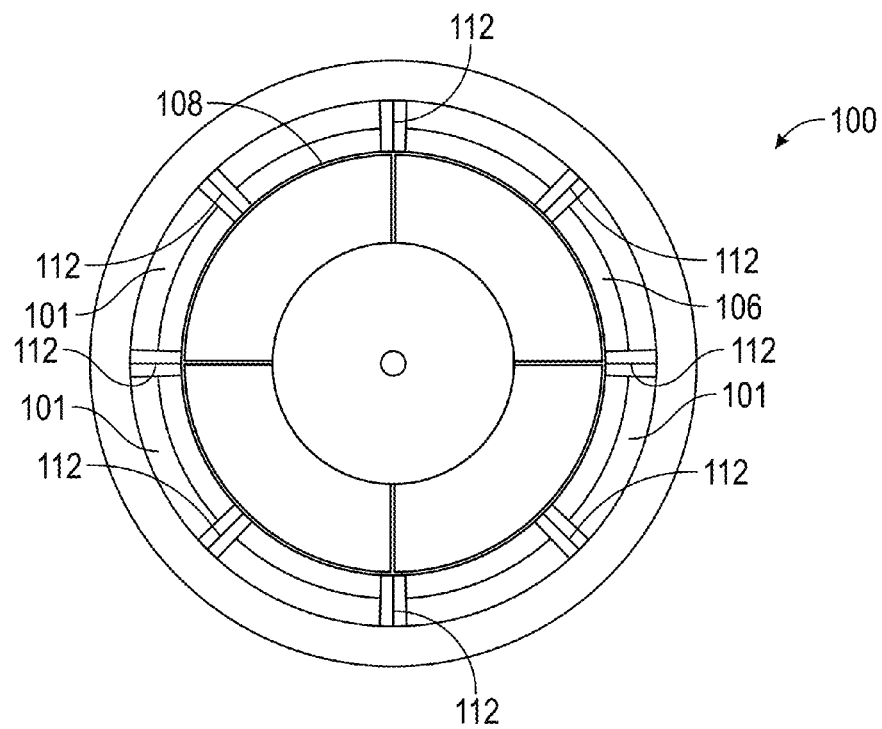
FIG. 13 schematically illustrates a plane view of the nozzle 100 from aft of the nozzle looking forward or upstream.

FIG. 12 schematically illustrates a cross-sectional view of a nozzle 100 with a bypass path 101 in accordance with an embodiment of the invention. FIG. 13 illustrates a plane view of the nozzle 100 looking upstream of the flow from aft of the nozzle. The nozzle 100 may be configured to exhaust the primary flow 102 from the engine and the bypass flow 104. The primary flow 102 and the bypass flow 104 are separated by a bypass wall 106. The nozzle also includes a trailing edge 108 on the bypass wall 106 and a trailing edge 110 on the outside surface of the nozzle 100. Struts 112 may be configured to couple the outer wall of the nozzle 100 with the bypass wall 106. As with the struts in the inlet, the struts in the nozzle bypass flowpath may be constructed from composite materials, as an example, and configured to reinforce the nozzle, producing a stiff, strong, and lightweight structure.

Figure 14A:
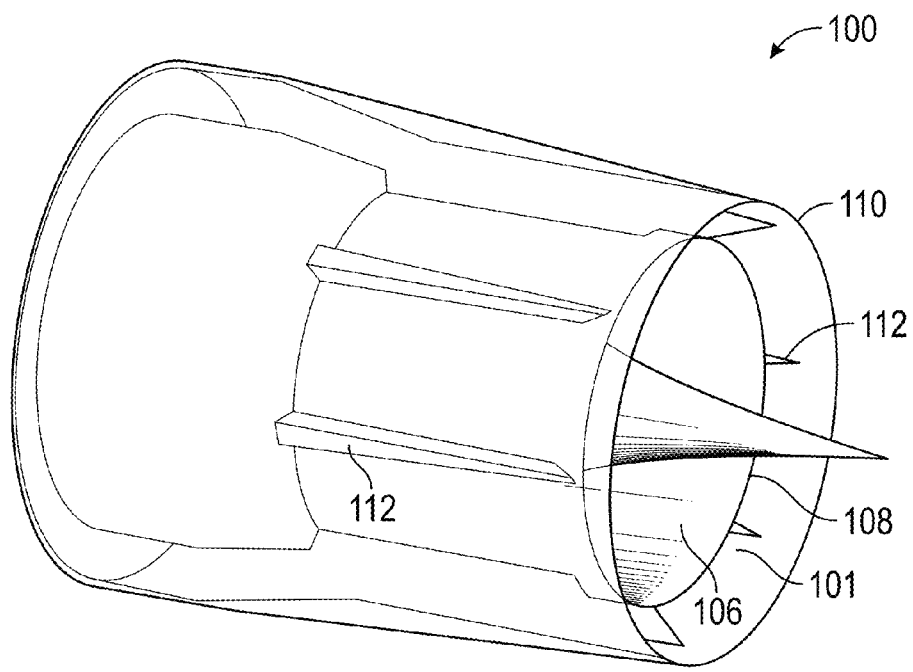
FIGS. 14A and 14B show perspective views of the nozzle 100 from FIGS. 12 and 13 with the outer surface of the nozzle drawn as transparent.
Figure 14B:
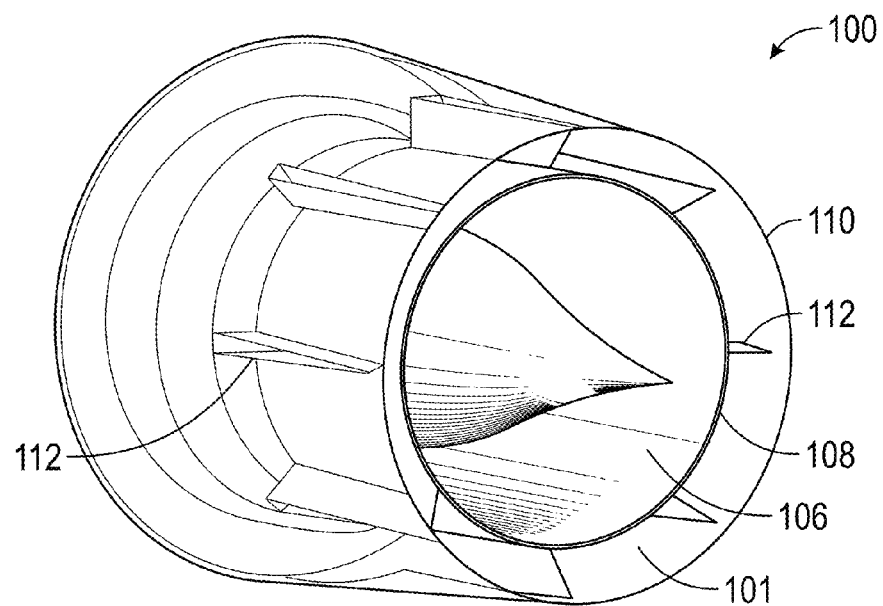

FIGS. 14A and 14B show perspective views of the nozzle 100 with the outer surface of the nozzle 100 drawn as transparent such that the internal struts 112 of the bypass 101 may be clearly seen. The outer wall of the nacelle may be constructed using thin-wall composite material construction techniques while using the size and placement of the struts for structural stiffening. Within the aft portion of the nozzle, as shown in FIGS. 13, 14A and 14B, the struts 112 may be configured with a variable thickness designed to control the exhaust expansion of the flow 104 in the bypass 101. This may allow the bypass 101 to be tailor-shaped in the aft portion of the nozzle by circumferentially varying the strut 112 thickness, controlling the exhaust expansion requirements based on local flow conditions, such as in-flow pressure and mass flow, at the nozzle. As done for the primary stream 102, the exhaust flow expansion requirements for the bypass flow 104 are determined by desired performance and sonic boom characteristics: the exhaust flow is usually fully expanded at design condition to maximize thrust and to minimize the exhaust stream's disturbance of the external flow field, but it might also be designed to positively influence the performance and sonic boom characteristics of the primary exhaust stream 102. The bypass arrangement shown in FIGS. 14A-B may maximize the use of linear surfaces for manufacturing simplicity. For example, the struts 112 may be constructed using linear surfaces while the thickness of the struts 112 may be tuned to produce the desired expansion characteristics based on local flow conditions.

Figure 15:
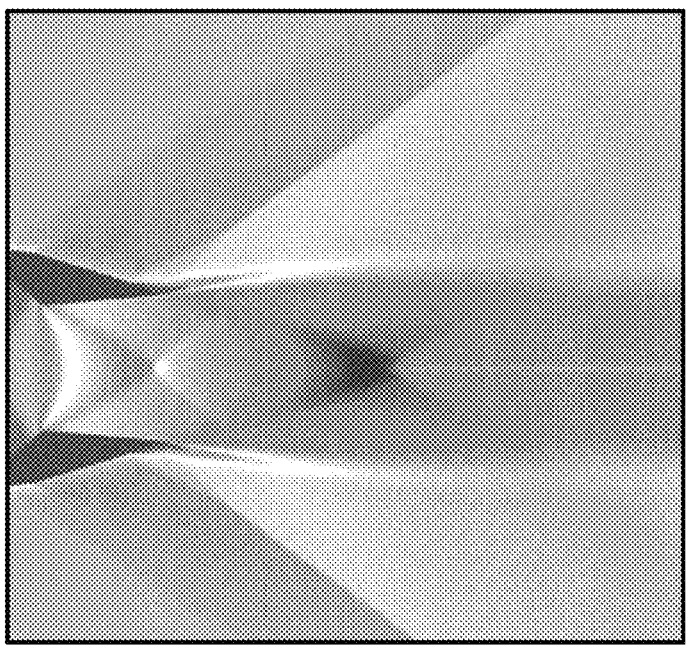
FIG. 15 illustrates a CFD solution at freestream speed of Mach 1.7 of the internal flowpath and external flow region for a representative traditional nozzle design featuring a large nozzle boat tail angle.
Figure 15:
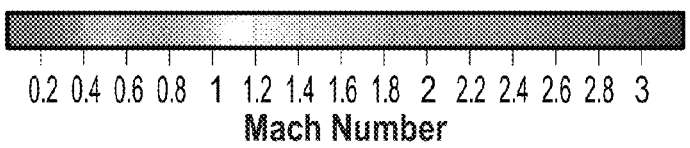

FIG. 15 illustrates a CFD solution at freestream speed of Mach 1.7 of the internal flowpath and external flow region for a conventional nozzle design as may be found on a high specific thrust military turbofan engine of approximately 11,000 $lb_f$ maximum takeoff thrust class (non-afterburning). The traditionally configured nacelle and nozzle of FIG. 15 produces a large nozzle boat tail angle due to the reduction in outer diameter as the nacelle approaches the trailing edge of the nozzle. The traditionally configured nacelle is shown in the figure to produce an extensive external expansion fan and a subsequent strong re-shock due to the sharp and steep turning angles on the nozzle's exterior surfaces.

Figure 16:
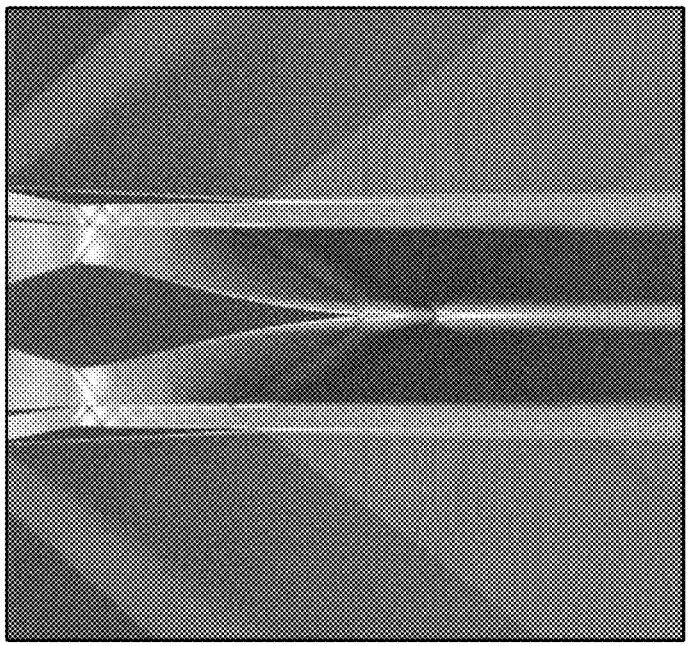
FIG. 16 illustrates a CFD solution at freestream speed of Mach 1.7 of the internal flowpath and external flow region for the nozzle shown in FIG. 12.
Figure 16:
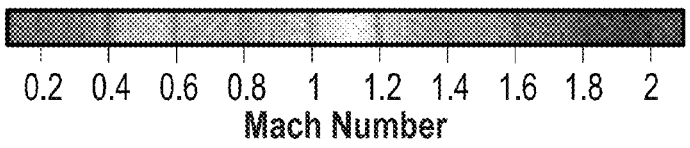

FIG. 16 illustrates a CFD solution at freestream speed of Mach 1.7 of the internal flowpath and external flow region for the nozzle shown in FIG. 12 and consistent with a conventional turbofan type engine cycle featuring approximately 15,000 lbrofmaximum takeoff thrust and a moderate fan-to-compressor flow ratio of 3. The bypass geometry illustrated in FIGS. 12, 13, and 14A-B, may be configured to permit improved matching between nozzle and maximum nacelle diameter, allowing the overall design of the nacelle to experience better streamlining of the outer nacelle and reduced nozzle boat tail angle and therefore weaker expansion and re-shock regions. As a result, a nacelle in accordance with embodiments of the invention may show an overall reduction in its contribution to the vehicle's sonic boom signature at supersonic flight speeds while minimizing, or eliminating altogether, the drag impact resulting from the larger nacelle necessary to incorporate the bypass system.

Figure 17:
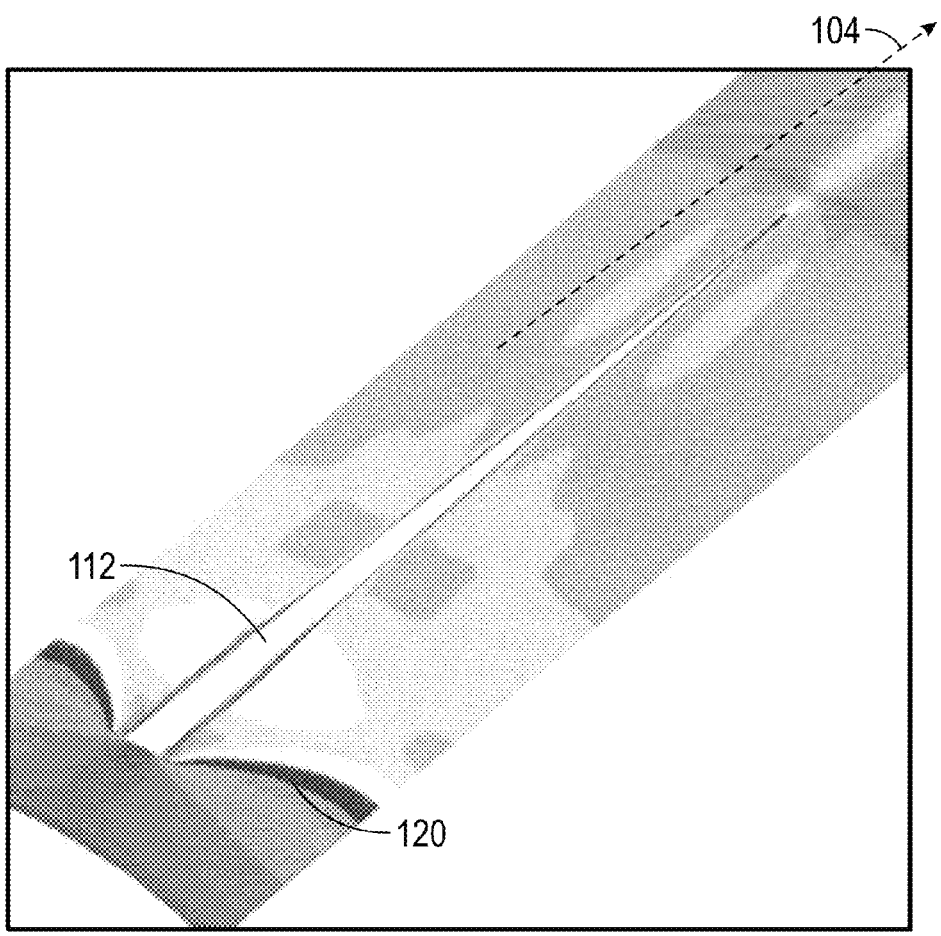
FIG. 17 illustrates a CFD solution for the flow around bypass struts 112 shown in FIGS. 12, 13, and 14A-B.

FIG. 17 illustrates a Mach-based CFD solution for the flow 104 around a nozzle bypass strut 112 shown in FIGS. 12, 13, and 14A-B for the Mach 1.7 design condition. The solution image denotes a cut-through of a wedged portion of the entire annular flow region, with a cross-sectional cut of one bypass strut. The CFD analysis illustrates the concept of controlling throat area through circumferential growth of the bypass struts, providing stable choke line positioning and required mass flow and expansion characteristics. FIG. 17 indicates the location of the bypass nozzle choke line 120. The CFD analysis also indicates that the bypass struts 112, shown in FIGS. 12, 13, and 14A-B have negligible impact on exhaust flow characteristics. In addition to providing structural performance, the thickness of the strut, shown in FIG. 17, may be used to control the expansion of the exhaust flow 104 through the bypass of the nozzle.

Figure 18:
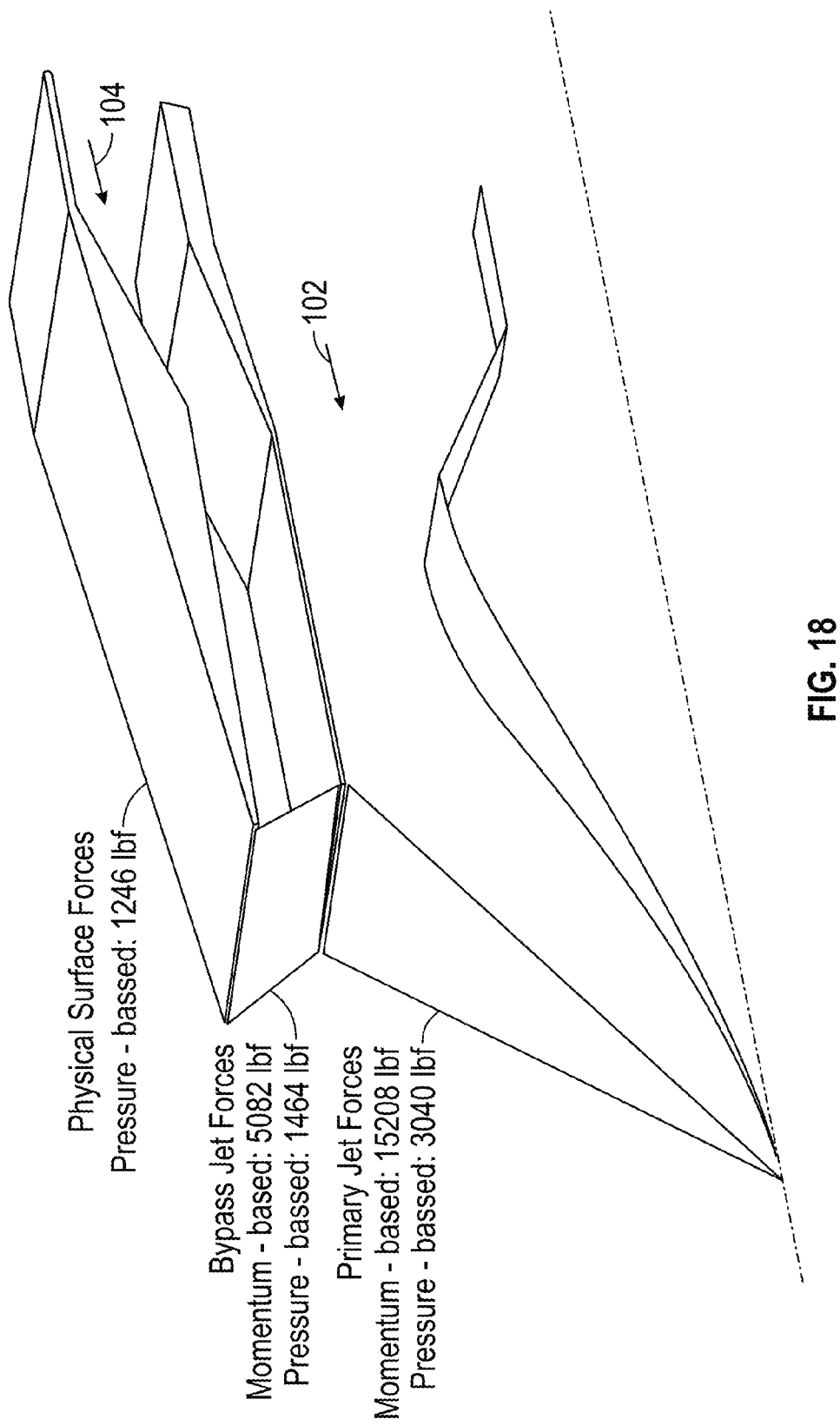
FIG. 18 schematically illustrates a visually exaggerated 2 degree radial section of the nozzle shown in FIGS. 12, 13, and 14A-B.

FIG. 18 schematically illustrates a 2 degree radial section of the nozzle 100 shown in FIGS. 12, 13, and 14A-B. Momentum-based and surface pressure-based forces were extracted from viscous CFD solutions at Mach 1.7 freestream consistent with the engine 52 shown in FIG. 5 operating at design condition. The total axial force summation for this configuration was determined to be 26,040 $lb_f$, resulting in a net propulsive force for the propulsion system adequate for meeting a supersonic vehicle cruise thrust requirement.

Figure 19:
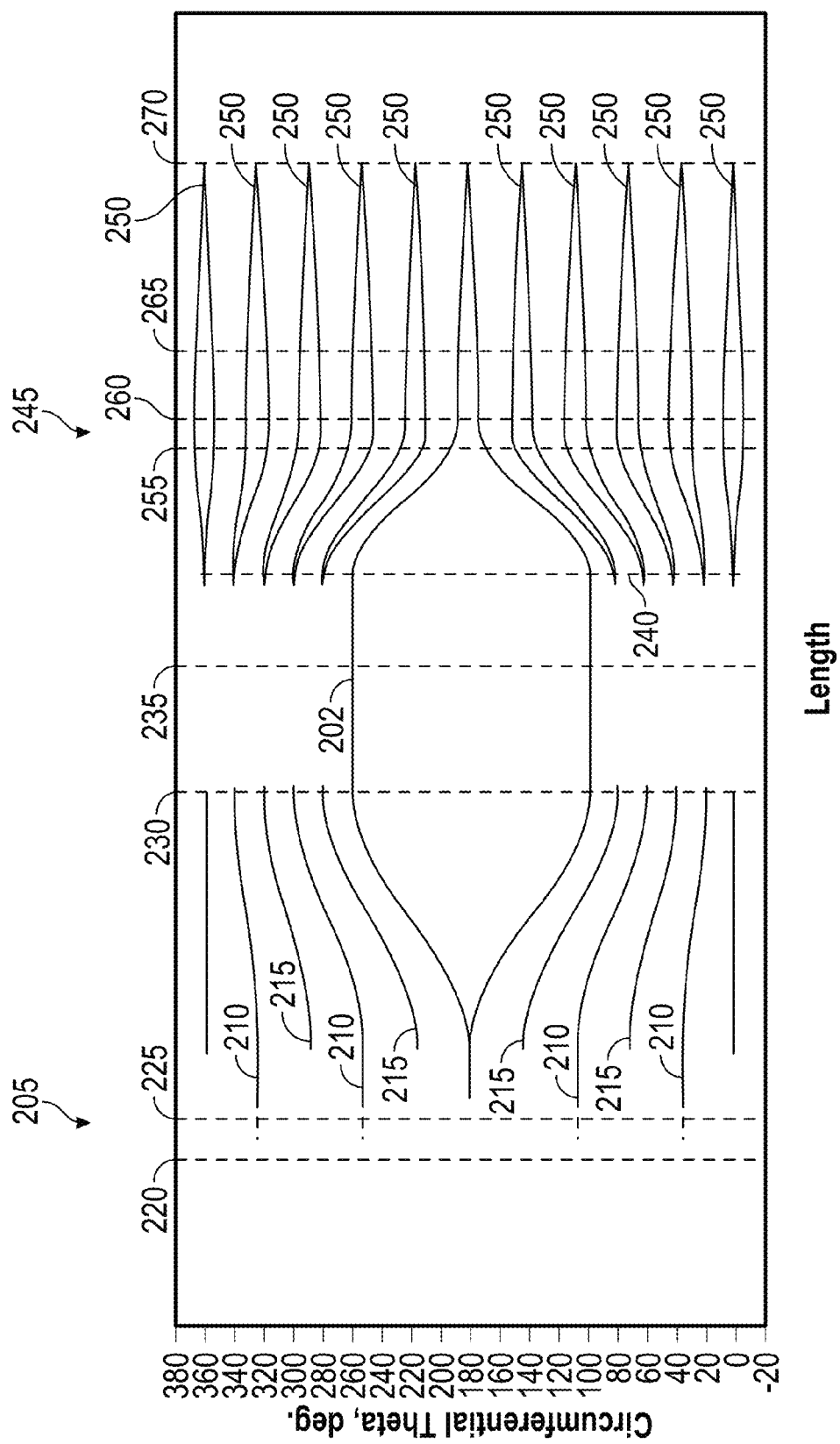
FIG. 19 illustrates a cylindrical coordinate view of a nacelle bypass geometry in accordance with another embodiment of the invention.

FIG. 19 illustrates another embodiment of the invention where a nacelle bypass geometry 200 is shown in cylindrical coordinates. Additional isometric and side views of nacelle bypass geometry 200 are also shown in FIGS. 20-27. As shown in FIG. 19, the nacelle bypass 200 is configured to direct the bypass flow around a gearbox fairing 202. The nacelle bypass geometry 200 comprises an inlet portion 205 having a set of long aerodynamic vanes 210 and a set of short aerodynamic vanes 215. The combination of the long aerodynamic vanes 210 and the short aerodynamic vanes 215 transforms an incoming airflow into a high subsonic flow within the bypass. The long aerodynamic vanes 210 function to direct air around blockages caused by the gearbox. As discussed above, the aerodynamic vanes may be configured as struts. In FIG. 19, the long aerodynamic vanes 210 and the short aerodynamic vanes 215 may also function as struts between the inner and outer walls of the bypass.

As shown in FIG. 19, the airflow entering the inlet reaches the long aerodynamic vanes 210 and the short aerodynamic vanes 215 after passing a cowl highlight plane 220 and a splitter leading edge plane 225. As the airflow passes through the vanes 210 and 215, diffusion of the airflow reduces the speed of an incoming airflow. The airflow may be slowed from a supersonic flow at the cowl highlight plane 220 to a subsonic flow by the time the airflow reaches the engine face plane 230. The flow remains subsonic between a forward mount plane 235 and a choke plane 240 of a nozzle section 245 of the nacelle bypass 200.

Nozzle section 245 of the nacelle bypass comprises a plurality of wedges 250 formed by vanes. As with the vanes 210 and 215, the wedges 250 may also form structural struts to support the outer cowl and form the bypass structure. In another embodiment of the invention, the vanes 210 and 215 may extend from the engine face plane 230, around the engine to meet up with matching wedges 250, forming a plurality of independent bypass flow paths.

Once airflow reaches the choke plane 240, the wedges 250 may be configured to accelerate the airflow to supersonic speeds. In accordance with one embodiment of the invention, the acceleration may be accomplished by compressing the flow to the choke plane 240, where the flow would then go supersonic.

The wedges 250 control the airflow from the aft mount plane 255, the engine rear plane 260, a cowl trailing edge plane 265, and a nozzle shroud trailing edge 270. Supersonic acceleration may also be induced in the airflow by configuring the wedges 250 such that an increase of the channel cross-sectional area created by a continuous reduction in the size of the wedges after the choke plane 255 and up to the trailing edge 270. The shape of the wedges 250 and the increase of the channel cross-sectional area between the wedges may be optimized to allow for isentropic expansion of the airflow as it accelerates out of the rear of the nacelle bypass. The cowl may end at the cowl trailing edge plane 265 with the wedges 250 extending beyond the cowl edge 265 and up to the nozzle shroud trailing edge 270. The wedges may split the airflow into separate regions as it exits the bypass which may help to prevent the coalescence of shock waves produced by the bypass exhaust. The prevention of the coalescence of shock waves may significantly reduce the strength of any shock wave formed off the trailing end of the nacelle, which is typically a strong contributor to the overall sonic boom characteristics of a supersonic vehicle.

Figure 20:
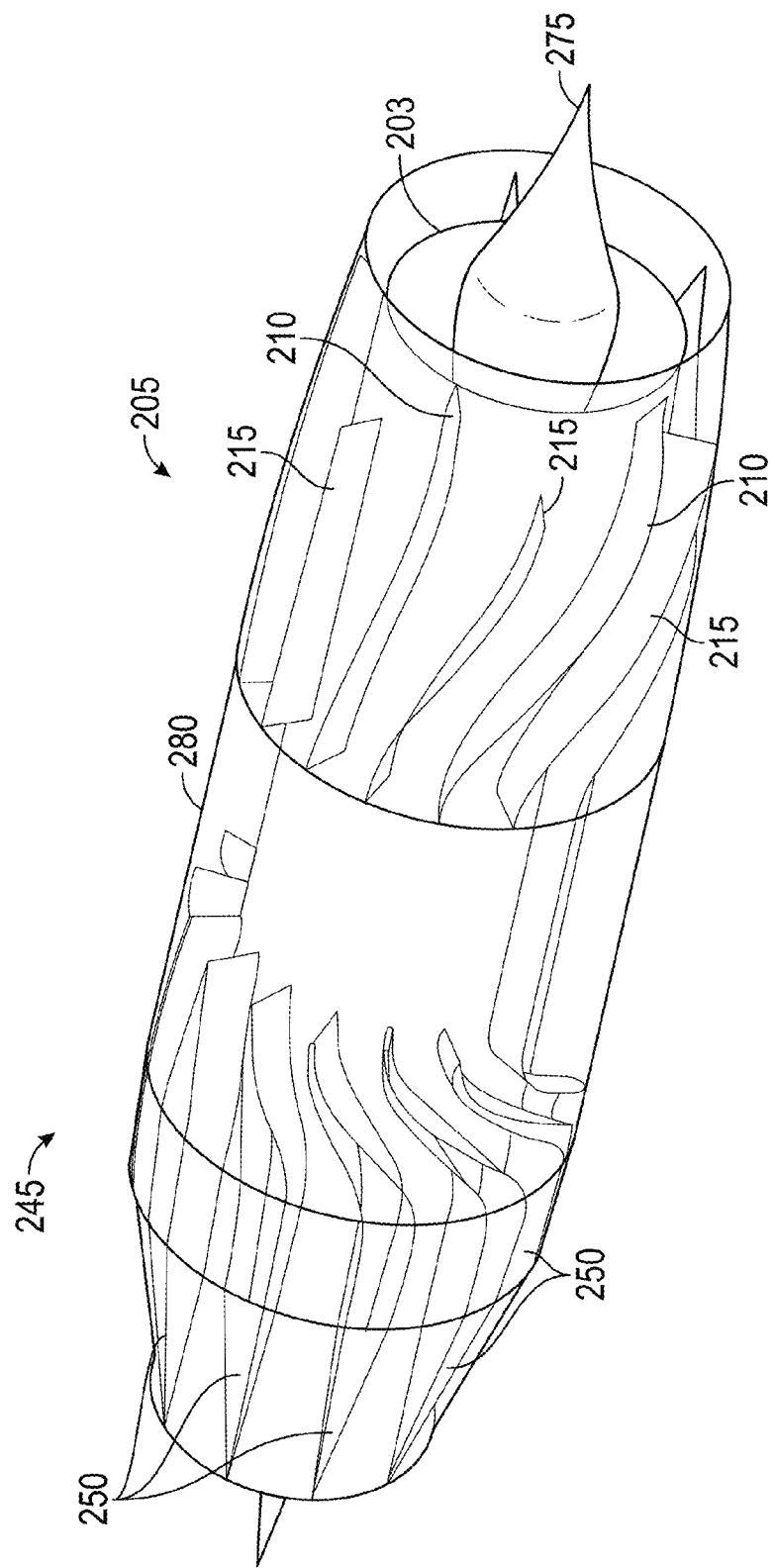
FIG. 20 illustrates an isometric front view of the nacelle bypass geometry of FIG. 19.

FIG. 20 illustrates a front isometric view of a nacelle with the cowl 280 shown as transparent so that the nacelle bypass geometry 200 (of FIG. 19) is visible. In addition, the inlet 205, the compression surface 275, and the splitter (or bypass wall) 203 are visible. The long aerodynamic vanes 210 and the short aerodynamic vanes 215 are disposed in the inlet section 205 between the bypass wall 203 and a cowl 280. In addition, the plurality of wedges 250 formed by vanes are also disposed in the nozzle section 245 between the bypass wall 203 and the cowl 280.

Figure 21:
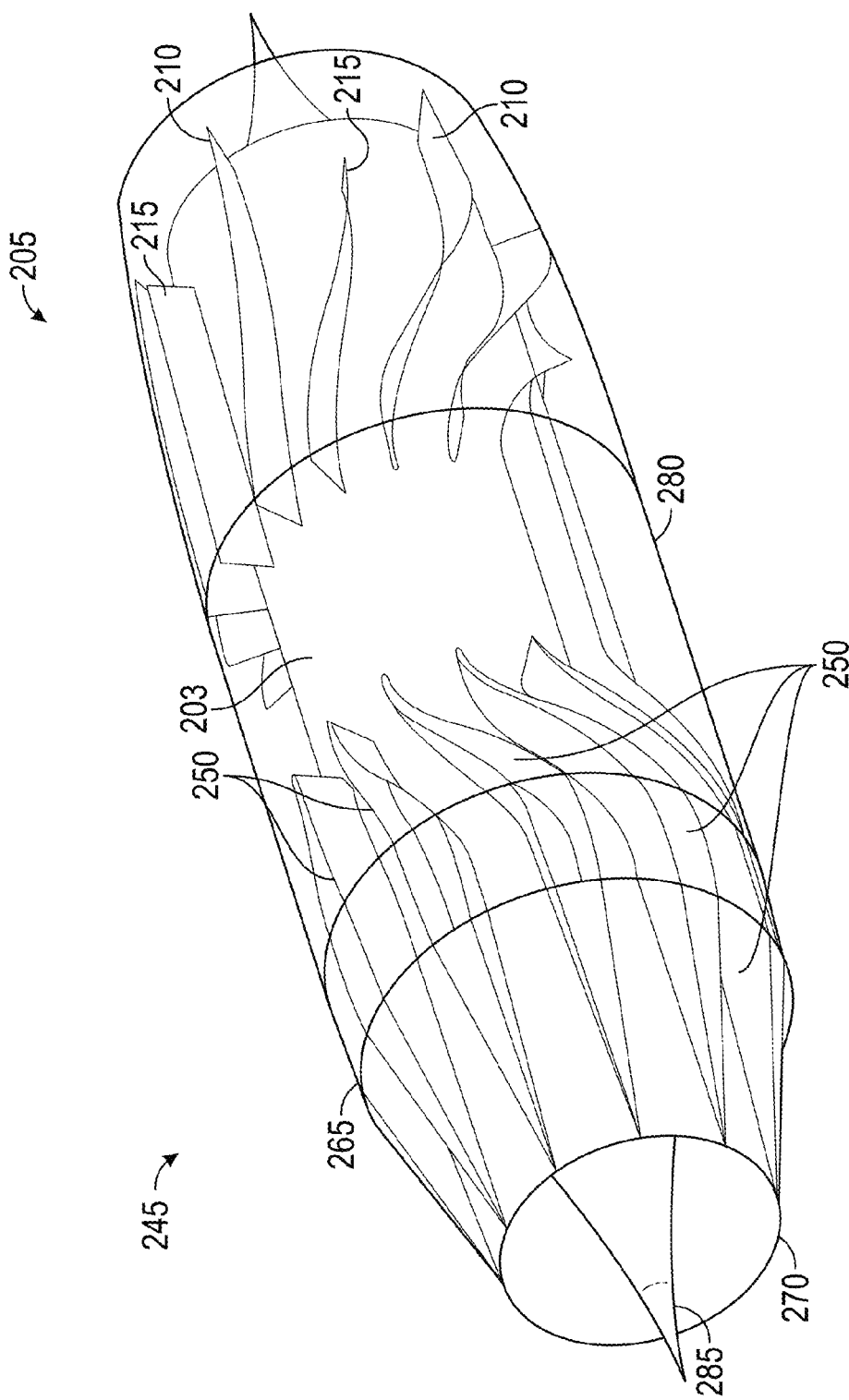
FIG. 21 illustrates an isometric rear view of the nacelle bypass geometry of FIG. 19.

FIG. 21 illustrates an isometric rear view of the nacelle of FIG. 20 with the cowl again shown in transparent. In FIG. 21, the nozzle 245 is shown with the nozzle centerbody 285 disposed internal to the bypass wall 203. From this view, the nozzle exit for the engine exhaust and the outlet for the bypass flow can be seen together. It is also possible to see how the wedges 250 extend beyond the trailing edge 265 of the cowl 280.

Figure 22:
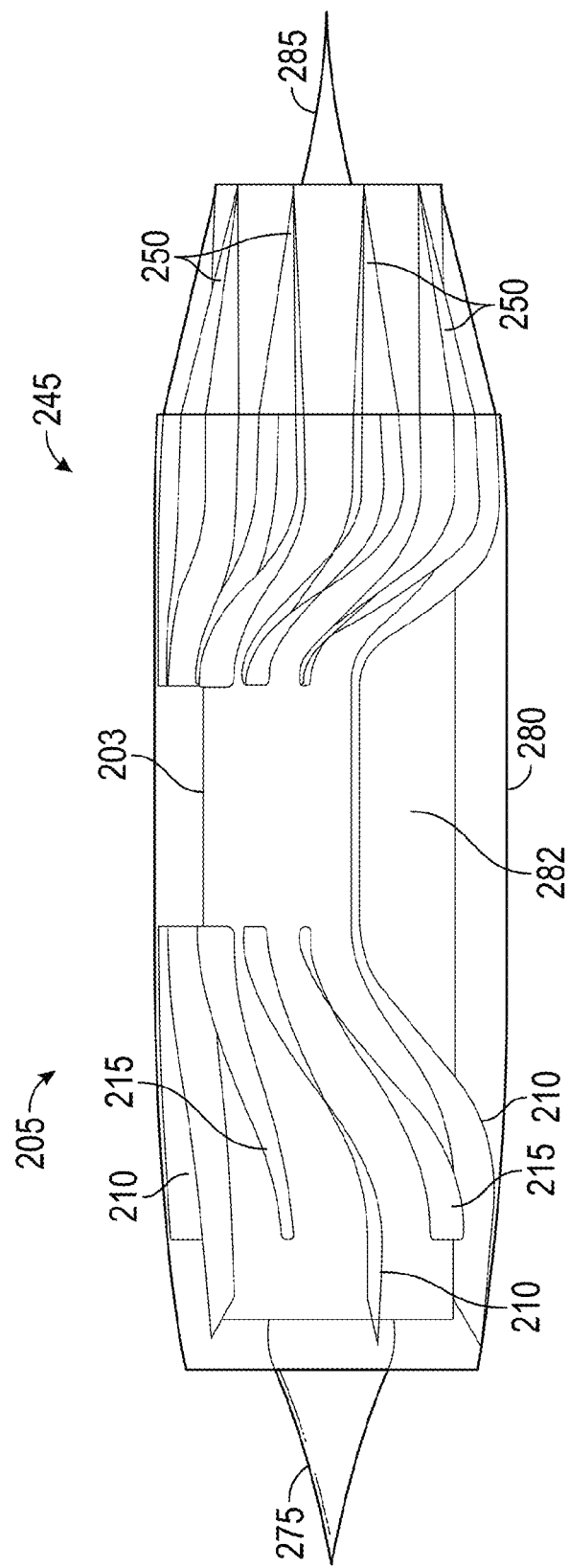
FIG. 22 illustrates a side view of the nacelle bypass geometry of FIG. 19.

FIG. 22 illustrates a side view of the nacelle of FIG. 20 with cowl 280 shown in transparent. As illustrated, the aerodynamic vanes 210 and 215 of the inlet section 205 and the wedges 250 of the nozzle section 245 do not connect with each other. As mentioned above, the long aerodynamic vanes 210 and the short aerodynamic vanes 215 may be configured such that they extend around the engine in a longitudinal direction in order to connect with the matching wedges 250 of the nozzle section 245.

From the view shown in FIG. 22, a gearbox fairing 282 is created (internal to the cowl 280) by the vanes 210. The gearbox fairing 282 provide necessary room to house the gearbox and other equipment used by the engine. By creating this space for the gearbox, the outer surface of the cowl 280 may have limited or no protrusions or discontinuities, which may reduce interference and pressure drag and the nacelle's contribution to the overall sonic boom signature of the vehicle.

Figure 23:
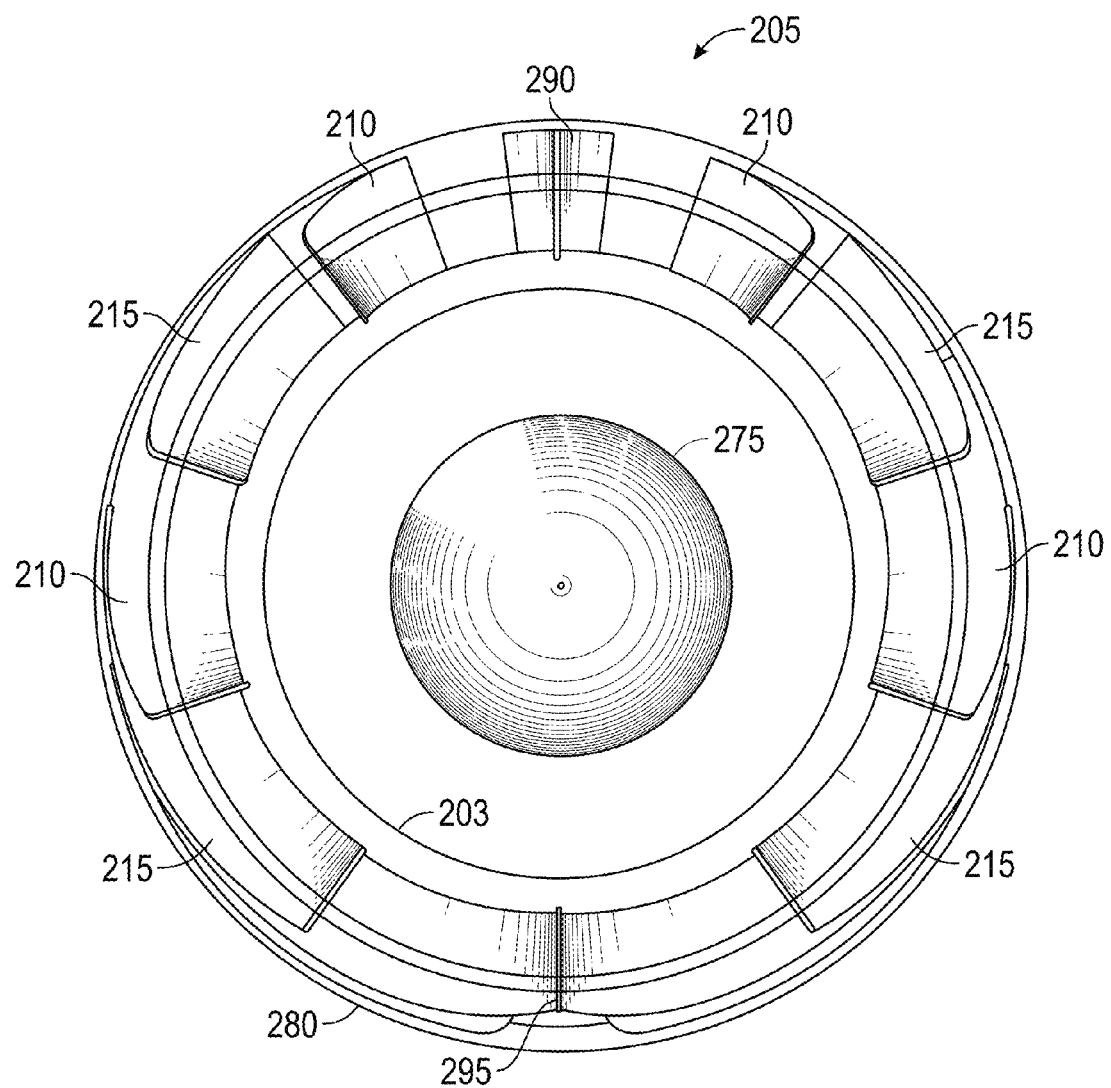
FIG. 23 illustrates a front view of an inlet section of the nacelle bypass geometry of FIG. 19.

FIG. 23 illustrates a front view of the nacelle of FIG. 20 and, in particular, the inlet 205 of nacelle bypass geometry 200 (shown in FIG. 19). As shown in the Figure, airflow that reaches the engine passes between the inlet compression surface 275 and internal to the bypass wall 203. Airflow bypassing the engine flows between the bypass wall 203 and the cowl 280, where the long aerodynamic vanes 210 and the short aerodynamic vanes 215 direct the airflow through the bypass and around the gearbox fairing 282 (shown in FIG. 22). As discussed in reference to FIG. 19, the long aerodynamic vanes 210 and the short aerodynamic vanes 215 may diffuse the incoming supersonic airflow to a subsonic flow. A straight aerodynamic vane 290 runs along the top of the nacelle bypass geometry 200. An aerodynamic vane 295 runs along the bottom of the nacelle bypass geometry 200. The vane 295 may be configured to bifurcate the airflow, internal to the cowl 280, around the engine gearbox and other engine equipment.

Figure 24:
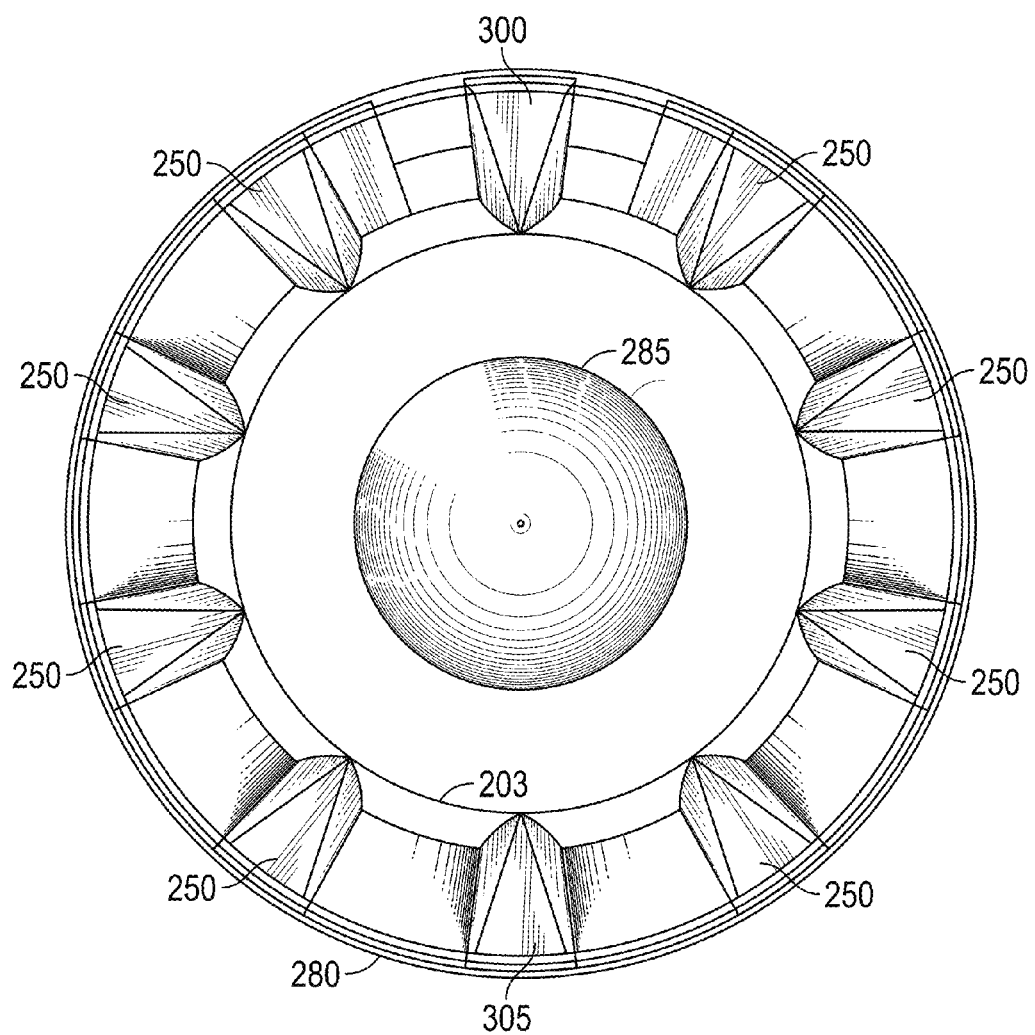
FIG. 24 illustrates a rear view of a nozzle section of the nacelle bypass geometry of FIG. 19.

FIG. 24 illustrates a rear view of the nacelle shown in FIG. 20 and, in particular, the rear of the nozzle 245 of nacelle bypass geometry 200. Airflow exiting the engine passes between the nozzle centerbody 285 and the bypass wall 203. Airflow that bypassed the engine exits by means of channels formed by wedges 250, the bypass wall 203, the cowl 280. The wedges are tailored so that the bypass exhaust stream achieves a target bypass exit Mach number, with the airflow that bypassed the engine exiting the nozzle section 245 at a supersonic speed. In at least one embodiment of the invention, the target bypass exit Mach number for the bypass exhaust stream is approximately Mach 1.5.

Figure 25:
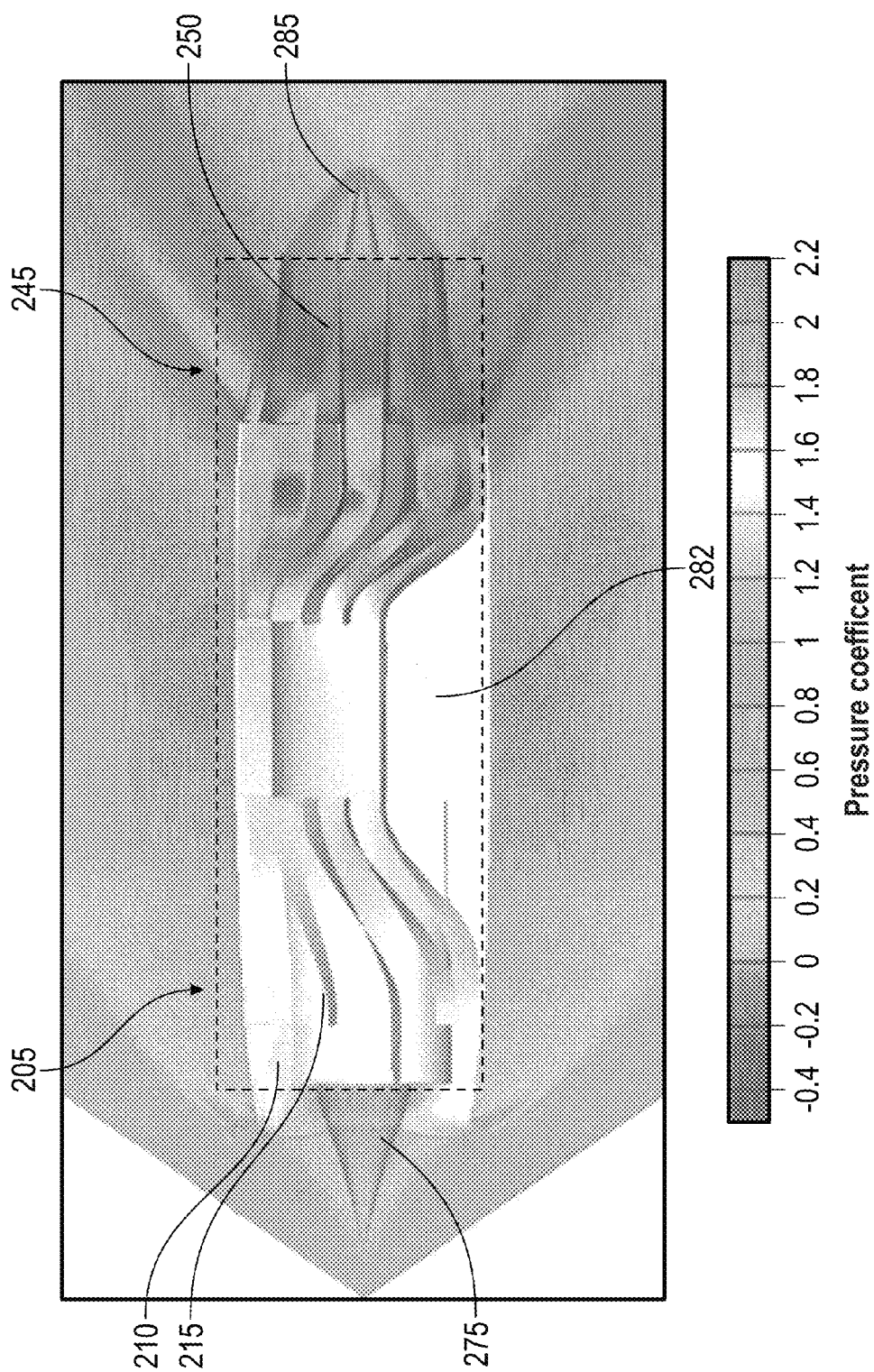
FIG. 25 illustrates a CFD solution for a nacelle geometry as shown in FIGS. 19-24.

FIG. 25 illustrates a viscous CFD solution of the airflow through the nacelle (including both the primary flow through the engine and the bypass flow through the nacelle bypass) shown in FIGS. 19-24. The Figure illustrates pressure coefficient data for the nacelle at Mach 1.7 freestream. At inlet section 205, airflow is incident on the inlet compression surface 275. The airflow that is captured within the primary flow path is directed to the engine. The remaining airflow captured by the inlet passes through the nacelle bypass 200. As shown in the Figure, the airflow is compressed in inlet section 205, which reduces the airflow from supersonic speed to a subsonic airflow.

After passing around the gearbox fairing 282, the airflow reaches the nozzle section 245. The wedges 250 separate the flow into channels and expands the flow into a supersonic exhaust flow around the nozzle. As shown in the FIG. 25, the airflow undergoes expansion due to the shape and configuration of the wedges 250, as explained above. As the airflow expands back to ambient conditions, it experiences less pressure, resulting in the lowered pressure coefficient.

Figure 26:
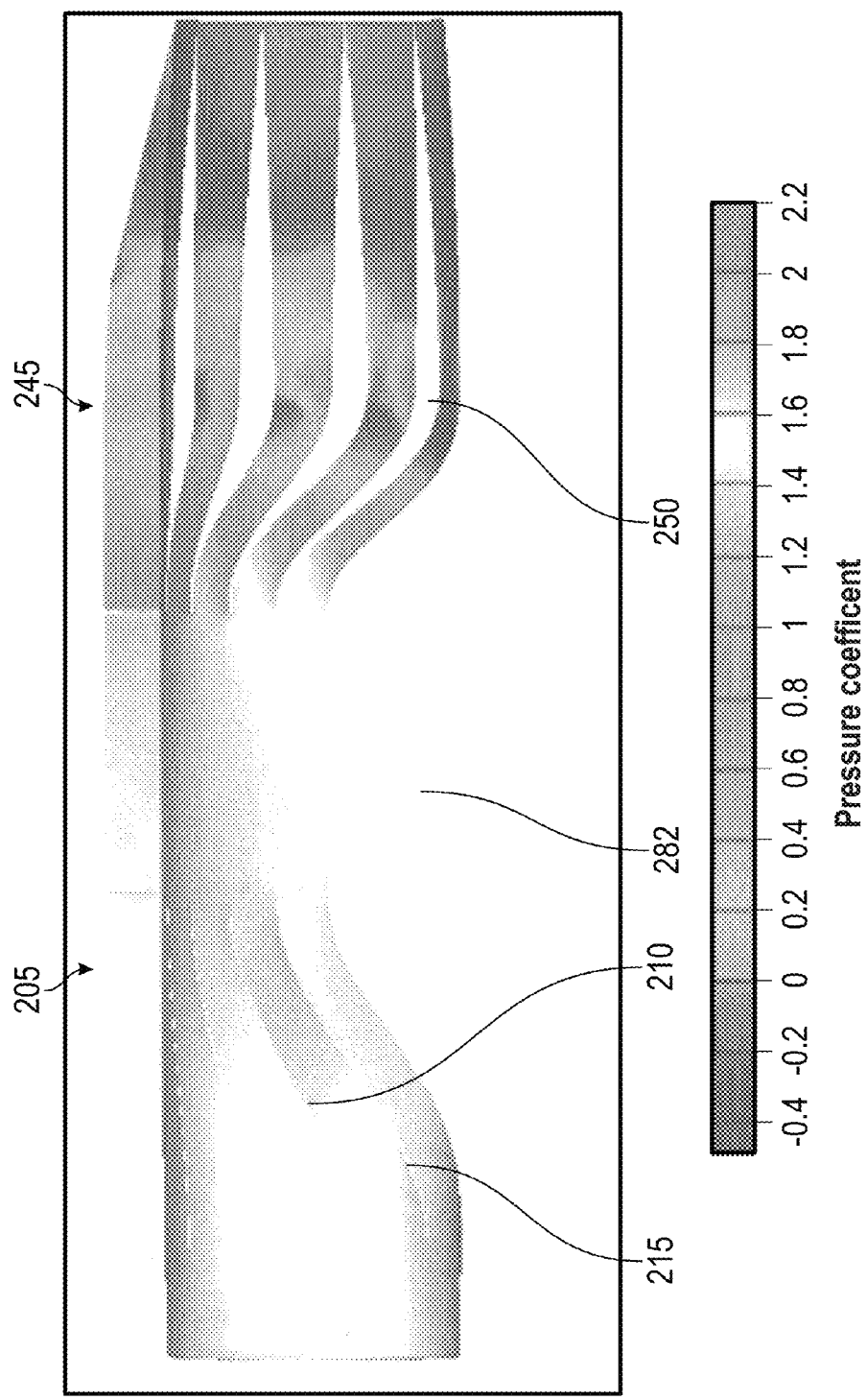
FIG. 26 illustrates a CFD solution for a nacelle geometry as shown in FIGS. 19-24.

FIG. 26 is a close-up of the viscous CFD solution (shown in FIG. 25) of the airflow flowing only through the nacelle bypass. The CFD solution in FIG. 26 shows that the airflow is steered by the vanes 210 and 215 in the inlet section of the nacelle. In addition, the CFD solution shows that expansion of the airflow around the backside of gearbox fairing 282 is accomplished without large-scale flow separation by the wedges 250.

Figure 27:
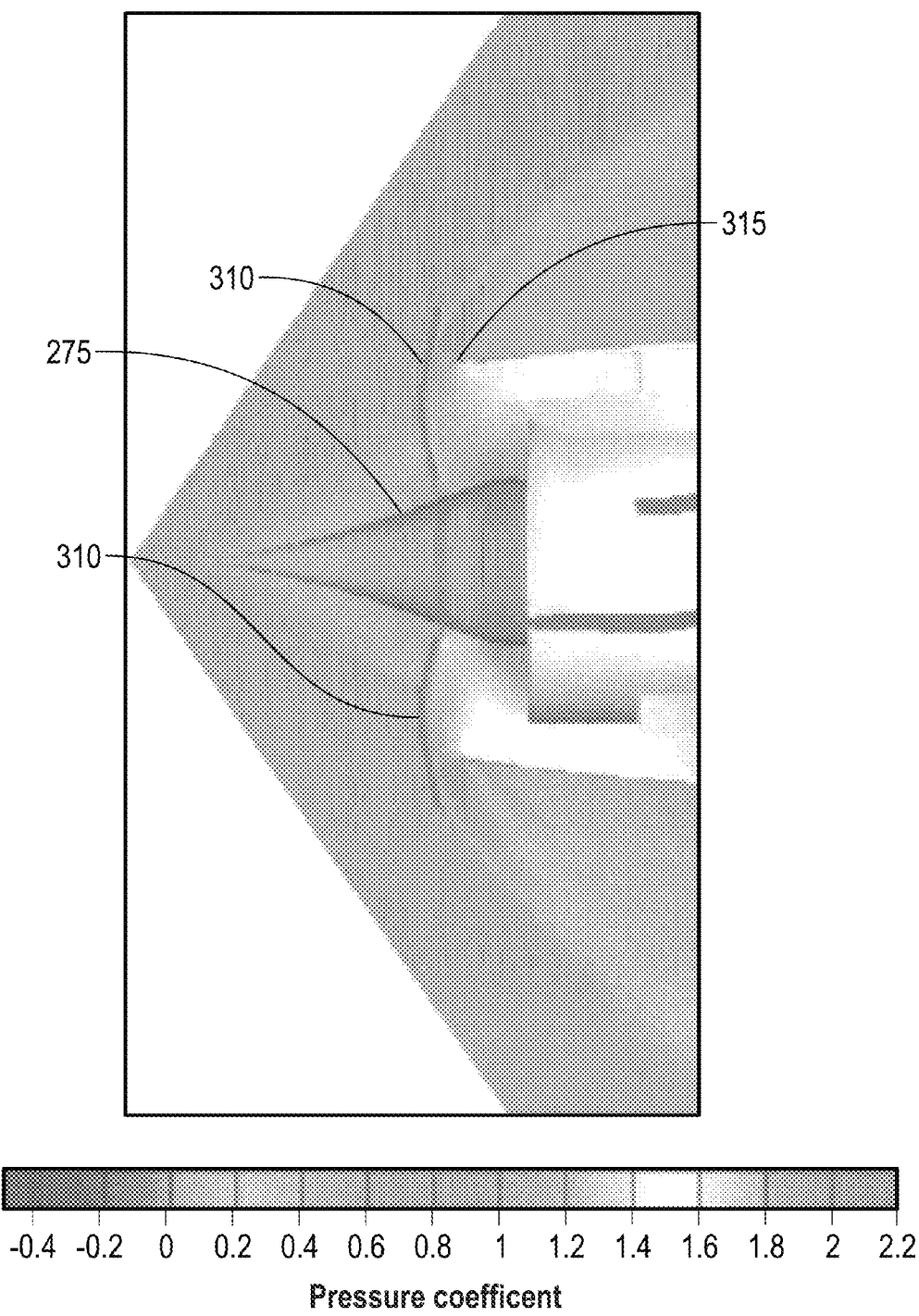
FIG. 27 illustrates a CFD solution for an inlet of a nacelle geometry as shown in FIGS. 19-20 and 22-23.

FIG. 27 is a close-up of the viscous CFD solution (shown in FIG. 25) of the supersonic airflow entering the inlet. As described in detail above, the inlet compression surface 275 and the cowl lip or leading edge 315 forms a terminal shock 310. The CFD solution shows that the terminal shock 310 is formed close to the cowl leading edge 315. This shows that the inlet effectively reduces airflow spillage outside the cowl leading edge 315. As discussed in detail above, the low spillage indicates that the internal losses and blockage losses that occur by bypassing some of the airflow captured by the inlet have been effectively managed. These internal losses and blockage issues would adversely affect the flow within the bypass. In addition, the CFD solution shows that the terminal shock 310 does not extend very far away from the cowl leading edge 315, which also indicates that spillage of airflow is being reduced and the nacelle bypass is capturing airflow that would ordinarily spill over in a conventional nacelle design.

It should be understood that a nacelle in accordance with an embodiment of the invention may be configured to use only the amount of bypass flow necessary to minimize shock characteristics to an acceptable level while still retaining adequate propulsion system performance. Such a design approach to a nacelle configuration may balance various design characteristics, such as sonic boom requirements, design Mach number, vehicle size, propulsion integration requirements, engine type, mission performance requirements, and mechanical complexity issues. Depending on the application, it is contemplated that nacelle configurations employing bypass may even bypass a flow that exceeds that of the primary flow. For example, a nacelle in accordance with embodiments of the invention could bypass as much as 160 percent of the primary flow.

Bypass design may be used to minimize the total pressure losses along the length of the flowpath. In addition, some traditional engine mount designs, such as solid-web crane beams, may be redesigned and opened to permit pass-through of additional flow. The use of a hard-shell skin over heavily distributed regions of engine external hardware can also be used to reduce flow losses and protect sensitive external engine components.

It also contemplated that the benefits of bypass may be maximized through the use of thin-wall nacelle construction, trading conventional structural design techniques by employing the bypass struts 72 and 112, for example, as critical structural members. This technique provides larger internal flowpath area, more diffusion potential, lower local velocities, and less pressure loss. In fact, careful internal bypass design may avoid opportunities for local choking forward of the nozzle which would otherwise lead to excessive ram drag, poor nozzle performance, and nondeterministic flow pumping characteristics.

The additional structural weight that would normally be incurred through growing the diameter of a conventional nacelle can be minimized for the high-flow bypass concept through judicious use of composite material (to assist with the thin-wall construction technique), strut design and placement, and reduced part-count due to reduced mechanical system complexity (for example, eliminating auxiliary low speed intakes normally used for distortion control).

Additionally, the bypass zone can also be utilized as a buffer region between the outer nacelle wall and the engine surface. This has implications when integrating the nacelle with the airframe. Adverse interference can be reduced when the outer wall shape along the length of the nacelle is tailored in a three-dimensional manner according to local flow characteristics near the airframe. This ability to tailor the wall shape is improved as the depth between the outer wall and the engine surface is increased, producing additional area and volume to work with. The bypass stream provides this additional depth along the length of the flowpath, increasing the opportunities for localized, tailored, three-dimensional shaping of the nacelle surface.

The foregoing descriptions of specific embodiments of the invention as defined by the claims below, including the preferred embodiments, are presented for purposes of illustration and description. They are not intended to be exhaustive or to limit the invention to the precise forms disclosed. Obviously, many modifications and variations are possible in view of the above teachings suited to particular uses.

What is claimed is:

1. A supersonic nozzle for a supersonic engine, comprising:
an outer wall;
a bypass wall disposed within the outer wall and configured to separate an airflow inside the outer wall into a primary flow portion and a bypass flow portion, the primary flow portion passing through a supersonic engine and the bypass flow portion passing through a bypass that bypasses the supersonic engine, the bypass flow portion comprising a subsonic flow; and
a set of struts configured to couple the outer wall with the bypass wall, the set of struts tailoring a direction of the bypass flow portion, the set of struts further configured to direct the bypass flow portion around the supersonic engine and to expand the bypass flow portion into a supersonic exhaust, a first sub-set of the set of struts having a first curvature that directs the bypass flow portion in a first circumferential direction around a protruding portion of the supersonic engine, a second sub-set of the set of struts having a second curvature that directs the bypass flow portion in a second circumferential direction around the protruding portion of the supersonic engine, a third sub-set of the set of struts disposed downstream of the first sub-set and having a third curvature that directs the bypass flow portion in the second circumferential direction, and a fourth sub-set of the set of struts disposed downstream of the second sub-set and having a fourth curvature that directs the bypass flow portion in the first circumferential direction.

2. The supersonic nozzle of claim 1, wherein the set of struts comprises composite materials for providing structural stiffness to the supersonic nozzle.

3. The supersonic nozzle of claim 1, wherein a thickness of the struts is configured to control an expansion of an exhaust from the supersonic engine.

4. The supersonic nozzle of claim 1, wherein the set of struts is constructed using linear surfaces.

5. The supersonic nozzle of claim 1, wherein the set of struts controls an amount of airflow depending on local blockage characteristics within the bypass flow portion; and
the set of struts shapes the bypass flow portion around internal blockages created by a gearbox of the supersonic engine.

6. The supersonic nozzle of claim 1, wherein the set of struts directs the bypass flow portion into a substantially circumferentially uniform pattern prior to exhaust.

7. The supersonic nozzle of claim 1, wherein the outer wall comprises a trailing edge that defines an exit cross-sectional area of the supersonic nozzle.

8. The supersonic nozzle of claim 1, wherein the supersonic nozzle expands the bypass flow portion to maximize a thrust of the supersonic engine and to minimize a sonic boom signature generated by exhaust of the primary flow portion.

9. The supersonic nozzle of claim 1, wherein the outer wall comprises a thin-wall composite construction.

10. The supersonic nozzle of claim 1, wherein the set of struts receive the bypass flow portion and direct the bypass flow portion into a subsonic flow portion.

11. A low shock supersonic nacelle, comprising:
an engine;
an outer wall;
a bypass wall disposed within the outer wall and configured to support the engine;
a set of struts configured to couple the outer wall with the bypass wall, a first sub-set of the set of struts having a first curvature that directs the bypass flow portion in a first circumferential direction around a protruding portion of the engine, a second sub-set of the set of struts having a second curvature that directs the bypass flow portion in a second circumferential direction around the protruding portion of the engine, a third sub-set of the set of struts disposed downstream of the first sub-set and having a third curvature that directs the bypass flow portion in the second circumferential direction, and a fourth sub-set of the set of struts disposed downstream of the second sub-set and having a fourth curvature that directs the bypass flow portion in the first circumferential direction;

an inlet defined by front portions of the outer wall and the bypass wall, the inlet configured to decelerate an incoming airflow to a speed compatible with the engine; and a nozzle defined by rear portions of the outer wall and the bypass wall, the nozzle configured to accelerate an exhaust from the engine and bypass, wherein the bypass wall divides the incoming airflow into a primary flow portion directed into the engine and a bypass flow portion directed into a bypass that bypasses the engine, the bypass flow portion comprising a subsonic flow, wherein the set of struts is further configured to direct the bypass flow portion around the engine and to expand the bypass flow portion into a supersonic exhaust.

12. The low shock supersonic nacelle of claim 11, wherein the inlet comprises:

a leading edge configured to generate a first shock wave;

a compression surface positioned downstream of the leading edge and having at least one curved section configured to generate compression; and a cowl lip on a cowling spatially separated from the compression surface such that the cowl lip and the compression surface define an inlet opening for receiving a supersonic flow;

wherein the compression surface is configured to generate a second shock wave that, during operation of the inlet at a predetermined cruise speed, extends from the compression surface to intersect the first shock wave at a point substantially adjacent to the cowl lip.

13. The low shock supersonic nacelle of claim 12, wherein the compression generated by the curved section is characterized by a series of Mach lines where, during operation of the inlet at the predetermined cruise speed, at least a plurality of the Mach lines do not focus on the point substantially adjacent to the cowl lip.

14. The low shock supersonic nacelle of claim 11, wherein the bypass flow portion receives a diffused region of flow distortion.

15. The low shock supersonic nacelle of claim 11, further comprising a diffuser that receives the primary flow portion and delivers a subsonic flow to the engine.

16. The low shock supersonic nacelle of claim 11, wherein the set of struts comprises composite materials configured to provide structural stiffness to the nozzle.

17. The low shock supersonic nacelle of claim 11, wherein a thickness of the struts is configured to control an expansion of exhaust from the engine.

18. The low shock supersonic nacelle of claim 11, wherein the set of struts is constructed using linear surfaces.

19. The low shock supersonic nacelle of claim 11, wherein the set of struts controls an amount of airflow depending on local blockage characteristics within the bypass; and the set of struts shapes the bypass flow portion around internal blockages created by a gearbox of the engine.

20. The low shock supersonic nacelle of claim 11, wherein the set of struts directs the bypass flow portion into a substantially circumferentially uniform pattern prior to exhaust.

21. The low shock supersonic nacelle of claim 11, wherein the outer wall comprises a trailing edge that defines an exit cross-sectional area of the nozzle.

22. The low shock supersonic nacelle of claim 11, wherein the nozzle expands the bypass flow portion to maximize a thrust of the supersonic engine and to minimize a sonic boom signature created by the primary flow portion.

23. The low shock supersonic nacelle of claim 11, wherein the outer wall comprises a thin-wall composite construction.

24. The low shock supersonic nacelle of claim 11, wherein increasing a distance between the outer wall and the engine increases opportunities for localized, tailored, three-dimensional shaping of the outer wall.

25. The low shock supersonic nacelle of claim 11, wherein the bypass attenuates instabilities in the incoming airflow at the inlet.

26. The low shock supersonic nacelle of claim 11, wherein the set of struts receive the bypass flow portion and direct the bypass flow portion into a subsonic flow portion.

27. A nacelle for a supersonic engine, comprising:

an outer wall defining a closed volume;

a bypass wall disposed within the closed volume of the outer wall, the outer wall and the bypass wall cooperating to form a bypass that bypasses the supersonic engine; and a set of vanes configured to couple the outer wall with the bypass wall, defining a bypass therebetween, the set of vanes directing a bypass airflow into a subsonic flow, the set of vanes further configured to direct the subsonic flow around the supersonic engine and to expand the subsonic flow into a supersonic exhaust, a first sub-set of the set of vanes having a first curvature that directs the bypass flow portion in a first circumferential direction around a protruding portion of the supersonic engine, a second sub-set of the set of vanes having a second curvature that directs the bypass flow portion in a second circumferential direction around the protruding portion of the supersonic engine, a third sub-set of the set of vanes disposed downstream of the first sub-set and having a third curvature that directs the bypass flow portion in the second circumferential direction, and a fourth sub-set of the set of vanes disposed downstream of the second sub-set and having a fourth curvature that directs the bypass flow portion in the first circumferential direction.

28. The nacelle of claim 27, wherein the set of vanes expands the subsonic flow into a substantially circumferentially uniform pattern prior to exhaust.

29. The nacelle of claim 27, wherein the set of vanes controls an amount of airflow depending on local blockage characteristics within the subsonic flow; and the set of vanes shapes the subsonic flow around internal blockages created by the gearbox of the supersonic engine.

30. The nacelle of claim 27, wherein the bypass wall is configured to separate an airflow inside the outer wall into a primary airflow and the bypass airflow, the primary airflow passing through a supersonic engine.

31. A low shock supersonic nacelle, comprising:

an engine;

an outer wall defining a closed volume;

a bypass wall disposed within the closed volume of the outer wall and configured to support the engine;

a set of vanes configured to couple the outer wall with the bypass wall, a first sub-set of the set of vanes having a first curvature that directs the bypass flow portion in a first circumferential direction around a protruding portion of the supersonic engine, a second sub-set of the set of vanes having a second curvature that directs the bypass flow portion in a second circumferential direction around the protruding portion of the supersonic engine, a third sub-set of the set of vanes disposed downstream of the first sub-set and having a third curvature that directs the bypass flow portion in the second circumferential direction, and a fourth sub-set of the set of vanes disposed downstream of the second sub-set and having a fourth curvature that directs the bypass flow portion in the first circumferential direction;

an inlet defined by front portions of the outer wall and the bypass wall, the inlet configured to decelerate an incoming airflow to a speed compatible with the engine, the bypass wall dividing the incoming airflow into a primary flow portion directed into the engine and a bypass flow portion directed into a bypass that bypasses the engine, the bypass flow portion comprising a subsonic flow; and a nozzle defined by rear portions of the outer wall and the bypass wall, the nozzle configured to accelerate an exhaust from the engine and the bypass, wherein the set of vanes is further configured to direct the bypass flow portion around the engine and to expand the bypass flow portion into a supersonic exhaust.

32. The low shock supersonic nacelle of claim 31, wherein the inlet comprises:

a leading edge configured to generate a first shock wave;

a compression surface positioned downstream of the leading edge and having at least one curved section configured to generate compression; and a cowl lip on a cowling spatially separated from the compression surface such that the cowl lip and the compression surface define an inlet opening for receiving a supersonic flow;

wherein the compression surface is configured to generate a second shock wave that, during operation of the inlet at a predetermined cruise speed, extends from the compression surface to intersect the first shock wave at a point substantially adjacent to the cowl lip.

33. The low shock supersonic nacelle of claim 31, further comprising:

an inlet compression surface generating a terminal shock formed close to a leading edge of the outer wall.

34. The low shock supersonic nacelle of claim 31, wherein the nozzle expands the bypass flow portion to maximize a thrust of the supersonic engine and to minimize a sonic boom signature created by the primary flow portion.

35. The low shock supersonic nacelle of claim 31, wherein the bypass attenuates instabilities in the incoming airflow at the inlet.

* * * * *